(12) United States Patent
Bickham et al.

(10) Patent No.: US 12,050,339 B2
(45) Date of Patent: Jul. 30, 2024

(54) ULTRA-LOW-LOSS COUPLED-CORE MULTICORE OPTICAL FIBERS

(71) Applicant: CORNING INCORPORATED, Corning, NY (US)

(72) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/201,368

(22) Filed: May 24, 2023

(65) Prior Publication Data

US 2023/0314697 A1    Oct. 5, 2023

Related U.S. Application Data

(62) Division of application No. 17/387,113, filed on Jul. 28, 2021, now Pat. No. 11,733,449.

(60) Provisional application No. 63/063,559, filed on Aug. 10, 2020.

(51) Int. Cl.
*G02B 6/02*    (2006.01)
(52) U.S. Cl.
CPC ..... *G02B 6/02042* (2013.01); *G02B 6/02019* (2013.01)

(58) Field of Classification Search
CPC ............ G02B 6/02042; G02B 6/02019; G02B 6/0365
See application file for complete search history.

(56) References Cited

U.S. PATENT DOCUMENTS

| | | | |
|---|---|---|---|
| 9,594,210 B2 | 3/2017 | Bookbinder et al. | |
| 9,618,692 B2 | 4/2017 | Berkey et al. | |
| 9,891,377 B2 | 2/2018 | Saito et al. | |
| 11,762,144 B2 * | 9/2023 | Matsui | G02B 27/0012 385/126 |
| 2017/0102501 A1 | 4/2017 | Hayashi | |
| 2018/0299613 A1 | 10/2018 | Nakanishi et al. | |
| 2019/0162896 A1 | 5/2019 | Bickham et al. | |
| 2020/0277219 A1 | 9/2020 | Khrapko | |

FOREIGN PATENT DOCUMENTS

| | | |
|---|---|---|
| EP | 3361296 A1 | 8/2018 |
| EP | 3425367 A1 | 1/2019 |
| WO | 2016/152507 A1 | 9/2016 |

OTHER PUBLICATIONS

Fontaine et al., "Coupled-Core Optical Amplifier," Optical Fiber Communication Conference Mar. 2017.
(Continued)

*Primary Examiner* — John Bedtelyon
(74) *Attorney, Agent, or Firm* — Kevin L. Bray

(57) ABSTRACT

A coupled-core multicore optical fiber has a plurality of cores that are doped with alkali metals or chlorine to achieve low attenuation and a large effective area. The cores may be embedded in a common cladding region that may be fluorine doped. The cores may also be doped with chlorine, either with the alkali metals described above or without the alkali metals.

19 Claims, 12 Drawing Sheets

(56) References Cited

OTHER PUBLICATIONS

Hayashi et al., "125-μm-cladding Coupled Multi-core Fiber with Ultra-low Loss of 0.158 dB/km and Record-low Spatial Mode Dispersion of 6.1 ps/km," Optical Fiber Communication Conference, 2016, Mar. 2016, pp. 20-22.
International Search Report and Written Opinion of the International Searching Authority; PCT/US2021/044123; dated Nov. 5, 2021; 15 pages; European Patent Office.
Lukasz Szostkiewicz, et al., "Cross talk analysis in multicore optical fibers by supermode theory," Optics Letters, vol. 41, No. 16, p. 3759-3762, published Aug. 15, 2016.
M. Koshiba et al., "Analytical Expression of Average Power-Coupling Coefficients for Estimating Intercore Crosstalk in Multicore Fibers," IEEE Photonics J., 4(5), 1987-95 (2012).
M. Li, et al., "Coupled Mode Analysis of Crosstalk in Multicore Fiber with Random Perturbations," in Optical Fiber Communication Conference, OSA Technical Digest (online), Optical Society of America, 2015, paper W2A.35.
R. Ryf at al., "Long-Distance Transmission over Coupled-Core Multicore Fiber," Proc. ECOC 2016 Postdeadline (Sep. 2016) pp. 3.
Shoichiro Matsuo, et al., "Crosstalk behavior of cores in multi-core fiber under bent condition," IEICE Electronics Express, vol. 8, No. 6, p. 385-390, published Mar. 25, 2011.
Single Mode Fiber Optics, Jeunhomme, pp. 39-44, Marcel Dekker, New York, 1990.
T Hayashi et al., "Coupled-Core Multi-Core Fibers: High-Spatial-Density Optical Transmission Fibers with Low Differential Modal Properties," Proc. ECOC 2015 pp. 3.
T. Hayashi et al., "Physical Interpretation of Intercore Crosstalk in Multicore Fiber: Effects of Macrobend, Structure Fluctuation, and Microbend," Optics Express, 21(5), 5401-12 (2013).
T. Hayashi, "Coupled Single-mode Multi-core Fiber Design for Long-haul MIMO Transmission System," Proc. SPIE vol. 10130 1013003-1 (2017).
T. Sakamoto et al., "Coupled Single-mode Multi-core Fiber Design for Long-haul MIMO Transmission System," Proc. OFC 2017, Paper Th1H.7 (Mar. 2017) pp. 3.
Zheng et al., "Mode-coupling analysis and trench design for large-mode-area low-cross-talk multicore fiber", In Applied Optics, vol. 52, No. 19, Jul. 1, 2013, pp. 4541-4548.

* cited by examiner

ULTRA-LOW-LOSS COUPLED-CORE MULTICORE OPTICAL FIBERS

This Application is a divisional of U.S. patent application Ser. No. 17/387,113, filed on Jul. 28, 2021, which claims priority under 35 USC § 119(e) from U.S. Provisional Patent Application Ser. No. 63/063,559 filed on Aug. 10, 2020, which is incorporated by reference herein in its entirety.

BACKGROUND

Field

The present disclosure pertains to optical fibers. More particularly, the present disclosure relates to coupled-core multicore optical fibers having a plurality of cores that are doped with alkali metals and/or chlorine to achieve low attenuation and a large effective area.

Technical Background

The transmission capacity through single-mode optical fiber has theoretically reached its fundamental limit of around 100 Tb/s/fiber. Transmitting even 80 Tb/s in a single-mode optical fiber over transoceanic distance has proven challenging in the absence of an improved optical signal-to-noise ratio (OSNR). The actual capacity limit over about 10,000 km of a submarine single-mode optical fiber system used in a transoceanic transmission system is only about 50 Tb/s, even with advanced ultra-low-loss and low-nonlinearity optical fibers.

Spatial division multiplexing (SDM) technologies are being studied intensively to overcome this capacity limit. Transmission capacity may be increased by increasing the fiber pair count in the cable, increasing the capacity of each fiber, or increasing both. However, in submarine cables, higher fiber counts have limited practicality because a thicker and heavier cable significantly increases the cable installation cost due to the limited loading capacities of the ships that deploy the cables.

Multicore fiber (MCF) may exhibit less transmission loss when used in transoceanic applications. However, for practical use in ultra-long-haul submarine systems, the MCF should have ultra-low loss (i.e., low attenuation) to produce a high OSNR, have high spatial-mode density to increase the spatial channel count, and enable low differential group delay (DGD) between spatial modes to decrease the digital signal processing complexity. Also, the standard cladding diameter of 125 μm should be maintained so that no major modifications are needed for installation of the cable.

SUMMARY

Thus, there is a need for new optical fibers that solve the problems described above while having satisfactory attenuation and an increased transmission capacity.

In a first aspect, either alone or in combination with any other aspect, a coupled-core multicore optical fiber includes an outer common cladding comprising a relative refractive index $\Delta_{OCC}$ relative to pure silica; and a plurality of cores disposed in the outer common cladding, each of the plurality of cores comprising a relative refractive index $\Delta_{Ci}$ relative to pure silica and a maximum relative refractive index $\Delta_{CLi}$ relative to pure silica. For the coupled-core multicore optical fiber $\Delta_{CLi} > \Delta_{Ci} > \Delta_{OCC}$. Each of the plurality of cores has an effective area at 1550 nm of greater than or equal to 120 micrometers² (μm²) and less than or equal to 160 μm². A coupling coefficient κ between adjacent cores of the plurality of cores is greater than or equal to $1 \times 10^{-3}$/m.

In a second aspect, either alone or in combination with any other aspect, a coupled-core multicore optical fiber includes an outer common cladding comprising a relative refractive index $\Delta_{OCC}$ relative to pure silica; and a plurality of cores disposed in the outer common cladding, each of the plurality of cores comprising an inner core portion comprising a relative refractive index $\Delta_{Ci}$ relative to pure silica and a maximum relative refractive index $\Delta_{CLi}$ relative to pure silica. For the coupled-core multicore optical fiber $\Delta_{CLi} > \Delta_{Ci} > \Delta_{OCC}$. Each of the inner core portions comprises greater than or equal to 0.02 wt. % and less than or equal to 0.15 wt. % fluorine. A distance between centers of an adjacent two of the plurality of cores is greater than or equal to 20 micrometers (μm) and less than or equal to 40 μm. A coupling coefficient κ between adjacent cores in the plurality of cores is greater than or equal to $1 \times 10^{-3}$/m.

In a third aspect, either alone or in combination with any other aspect, a distance between centers of an adjacent two of the plurality of cores is greater than or equal to 45 μm and less than or equal to 65 μm.

In a fourth aspect, either alone or in combination with the third aspect, a crosstalk between the plurality of cores is greater than or equal to −50 decibels (dB) per kilometer.

In a fifth aspect, either alone or in combination with any other aspect, the coupled-core multicore optical fiber includes greater than or equal to 2 and less than or equal to 6 of the cores.

In a sixth aspect, either alone or in combination with the fifth aspect, the coupled-core multicore optical fiber includes 3 sets of 3 of the cores.

In a seventh aspect, either alone or in combination with any other aspect, a cable cutoff wavelength of each of the plurality of cores of the optical fiber is greater than or equal to 1200 nanometers (nm) and less than or equal to 1520 nm.

In an eighth aspect, either alone or in combination with the seventh aspect, an average bend loss of the plurality of cores of the optical fiber at a wavelength of 1550 nm measured on a mandrel having a diameter of 20 millimeters (mm) is greater than or equal to 0.01 decibels per turn (dB/turn) and less than or equal to 1 dB/turn.

In a ninth aspect, either alone or in combination with any other aspect, an average bend loss of the plurality of cores of the optical fiber at a wavelength of 1550 nm measured on a mandrel having a diameter of 30 mm is greater than or equal to 0.001 decibels per turn (dB/turn) and less than or equal to 0.03 dB/turn.

In a tenth aspect, either alone or in combination with any other aspect, a minimum distance between a center of one of the plurality of cores to an adjacent edge of the optical fiber along a line formed by a centerpoint of the optical fiber, the center of the one of the plurality of cores, and the adjacent edge in a plane perpendicular to a long axis of the coupled-core multicore optical fiber is greater than or equal to 30 μm and less than or equal to 50 μm.

In an eleventh aspect, either alone or in combination with any other aspect, each of the plurality of cores comprises an inner core portion surrounded by an inner cladding portion.

In a twelfth aspect, either alone or in combination with any other aspect, each inner cladding portion comprises a relative refractive index $\Delta_{ICi}$, the inner core portion comprises the $\Delta_{CLi}$, and $\Delta_{CLi} > \Delta_{Ci} > \Delta_{ICi} > \Delta_{OCC}$.

In a thirteenth aspect, either alone or in combination with any other aspect, each of the plurality of cores comprises an inner cladding portion and an inner core portion corresponding to the inner cladding portion, each inner cladding portion surrounding the corresponding inner core portion.

It is to be understood that both the foregoing general description and the following detailed description are merely exemplary and are intended to provide an overview or framework to understand the nature and character of the claims. Additional features and advantages will be set forth in the detailed description which follows, and in part will be readily apparent to those skilled in the art from the description or recognized by practicing the embodiments as described in the written description and claims hereof, as well as the appended drawings.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1:
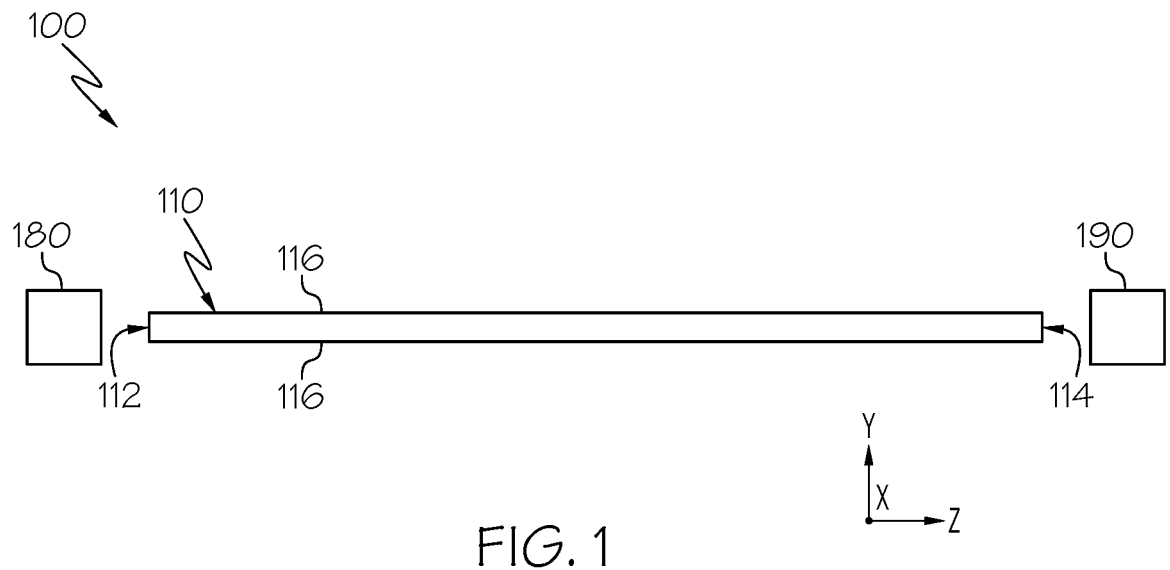
FIG. 1 schematically depicts an optical system including a signal source, a multicore optical fiber, and a photodetector, according to one or more embodiments shown and described herein.

In this specification and in the claims which follow, reference will be made to a number of terms which shall be defined to have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

A multicore optical fiber, also referred to as a multicore fiber or "MCF", is considered for the purposes of the present disclosure to include two or more core fibers disposed within a cladding matrix. Each core fiber can be considered as having a higher index core surrounded by a lower index cladding matrix defining a common cladding. Optionally, each core fiber can include a higher index core surrounded by one or more lower index inner claddings disposed between each core and the cladding matrix of the common cladding. As used herein, the term "inner core portion" refers to the higher index core. That is, a core fiber may include an inner core portion and optionally one or more lower index inner claddings.

"Radial position" and/or "radial distance," when used in reference to the radial coordinate "r" refers to radial position relative to the centerline (r=0) of each individual core in a multicore optical fiber. "Radial position" and/or "radial distance," when used in reference to the radial coordinate "R" refers to radial position relative to the centerline (R=0, central fiber axis) of the multicore optical fiber. The length dimension "micrometer" may be referred to herein as micron (or microns) or μm.

The "refractive index profile" is the relationship between refractive index or relative refractive index and radial distance r from the core's centerline for each core fiber of the multicore optical fiber. For relative refractive index profiles depicted herein as having step boundaries between adjacent core and cladding regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to multicore optical fibers and fiber cores of multicore optical fibers is defined according to equation (1):

$$\Delta\% = 100\frac{n^2(r) - n_c^2}{2n^2(r)} \quad (1)$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by Δ (or "delta") or Δ % (or "delta %") and its values are given in units of "%" or "% Δ", unless otherwise specified. Relative refractive index may also be expressed as Δ(r) or Δ(r) %. When the refractive index of a region is less than the reference index $n_c$, the relative refractive index is negative and can be referred to as a trench. When the refractive index of a region is greater than the reference index $n_c$, the relative refractive index is positive and the region can be said to be raised or to have a positive index.

The average relative refractive index of a region of the multicore optical fiber can be defined according to equation (2):

$$\Delta\% = \frac{\int_{r_{inner}}^{r_{outer}} \Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The term "α-profile" (also referred to as an "alpha profile") refers to a relative refractive index profile Δ(r) that has the following functional form (3):

$$\Delta(r) = \Delta(r_0)\left\{1 - \left[\frac{|r - r_0|}{(r_1 - r_0)}\right]^\alpha\right\} \quad (3)$$

where $r_o$ is the point at which Δ(r) is maximum, $r_1$ is the point at which Δ(r) is zero, and r is in the range $r_i \le r \le r_f$, where $r_i$ is the initial point of the α-profile, $r_f$ is the final point of the α-profile, and α is a real number. In some embodiments, examples shown herein can have a core alpha of $1 \le \alpha \le 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to an α-profile, where α≥10.

The "effective area" can be defined as (4):

$$A_{eff} = \frac{2\pi\left[\int_0^\infty (f(r))^2 r dr\right]^2}{\int_0^\infty (f(r))^4 r dr} \quad (4)$$

where f(r) is the transverse component of the electric field of the guided optical signal and r is radial position in the fiber. "Effective area" or "$A_{eff}$" depends on the wavelength of the optical signal. Specific indication of the wavelength will be made when referring to "Effective area" or "$A_{eff}$" herein. Effective area is expressed herein in units of "$\mu m^2$", "square micrometers", "square microns" or the like.

Unless otherwise noted herein, optical properties (such as dispersion, dispersion slope, etc.) are reported for the LP01 mode.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero-dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm²/km, respectively. Chromatic dispersion is measured as specified by the IEC 60793-1-42:2013 standard, "Optical fibres—Part 1-42: Measurement methods and test procedures—Chromatic dispersion."

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The "theoretical cutoff wavelength", or "theoretical fiber cutoff", or "theoretical cutoff", for a given higher-order mode, is the wavelength above which guided light cannot propagate in that higher-order mode. According to an aspect of the present disclosure, the cutoff wavelength refers to the cutoff wavelength of the LP11 mode. A mathematical definition can be found in Single Mode Fiber Optics, Jeunhomme, pp. 39-44, Marcel Dekker, New York, 1990, wherein the theoretical fiber cutoff is described as the wavelength at which the mode propagation constant becomes equal to the plane wave propagation constant in the common cladding. This theoretical wavelength is appropriate for an infinitely long, perfectly straight fiber that has no diameter variations.

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

The term "attenuation," as used herein, is the loss of optical power as the signal travels along the optical fiber. Attenuation is measured as specified by the IEC 60793-1-40:2019 standard entitled "Optical fibres—Part 1-40: Attenuation measurement methods."

As used herein, the multicore optical fiber can include a plurality of cores, wherein each core can be defined as an $i^{th}$ core (i.e., $1^{st}$, $2^{nd}$, $3^{rd}$, $4^{th}$, etc. . . . ). Each $i^{th}$ core can have an outer radius $r_{Ci}$, an average relative refractive index $\Delta_{Ci}$, and a maximum relative refractive index $\Delta_{CiMAX}$. Each $i^{th}$ core is disposed within a cladding matrix of the multicore optical fiber, which defines an outer common cladding of the multicore optical fiber. The outer common cladding includes a relative refractive index $\Delta_{OCC}$ and an outer radius $R_{OCC}$. Optionally, an inner common cladding may be disposed within the outer common cladding of the multicore optical fiber. The inner common cladding includes a relative refractive index $\Delta_{ICC}$ and an outer radius $R_{ICC}$. In embodiments in which the inner common cladding is not present, the refractive index of the outer common cladding is typically referred to as $\Delta_{CC}$ and the outer radius of the common cladding is typically referred to as $R_{CC}$.

Optionally, each $i^{th}$ core includes a corresponding $i^{th}$ centerline region that includes an outer radius $r_{CLi}$ and maximum relative refractive index $\Delta_{CLi}$. Thus, i=1 refers to a first core having an outer radius $r_{C1}$ and relative refractive index $\Delta_{C1}$ and a centerline region having an outer radius $r_{CL1}$ and maximum relative refractive index $\Delta_{CL1}$. When i=2, the core is referred to as a second core having an outer radius $r_{C2}$ and relative refractive index $\Delta_{C2}$. When the second core includes a corresponding $i^{th}$ centerline region, where i=2, it is referred to as the second centerline region and includes an outer radius $r_{CL2}$ and maximum relative refractive index $\Delta_{CL2}$. Each additional $i^{th}$ core and optional $i^{th}$ inner cladding is referred to as a third core and optional centerline region (i=3), a fourth core and optional fourth centerline region (i=4), etc. . . . . The number assigned to each $i^{th}$ core is used to distinguish one core from another for the purposes of discussion and does not necessarily imply any particular ordering of the cores.

Optionally, each $i^{th}$ core is surrounded by a corresponding $i^{th}$ inner cladding having a width $\delta r_{ICi}$ and a relative refractive index $\Delta_{ICi}$. Thus, i=1 refers to a first core having an outer radius $r_{C1}$ and relative refractive index $\Delta_{C1}$. When the first core is surrounded by a corresponding $i^{th}$ inner cladding, where i=1, it is referred to as the first inner cladding and has a width $\delta r_{IC1}$ and a relative refractive index $\Delta_{IC1}$. When i=2, the core is referred to as a second core having an outer radius $r_{C2}$ and relative refractive index $\Delta_{C2}$. When the second core is surrounded by a corresponding $i^{th}$ inner cladding, where i=2, it is referred to as the second inner cladding and includes a width $\delta r_{IC2}$ and a relative refractive index $\Delta_{IC2}$. Each additional $i^{th}$ core and optional $i^{th}$ inner cladding is referred to as a third core and optional third inner cladding (i=3), a fourth core and optional fourth inner cladding (i=4), etc. . . . . The number assigned to each $i^{th}$ core is used to distinguish one core from another for the purposes of discussion and does not necessarily imply any particular ordering of the cores.

According to one aspect of the present disclosure, the core forms the central portion of each core fiber within the multicore optical fiber and is substantially cylindrical in shape. In addition, when present, the surrounding inner cladding region is substantially annular in shape. Annular regions may be characterized in terms of an inner radius and an outer radius. Radial positions r refer herein to the outermost radii of the region (e.g., the core, the centerline region, the inner cladding region, etc. . . . ). When two regions are directly adjacent to each other, the outer radius of the inner of the two regions coincides with the inner radius of the outer of the two regions. For example, in embodiments in which an inner cladding region surrounds and is directly adjacent to a core region, the outer radius of the core region coincides with the inner radius of the inner cladding region and the outer radius of the inner cladding region is separated from the inner radius of the inner cladding region by the width $\delta r_{IC}$.

An "up-dopant" is herein considered to be a substance added to the glass of the component being studied that has a propensity to raise the refractive index relative to pure undoped silica. A "down-dopant" is herein considered to be a substance added to the glass of the component being studied that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "crosstalk" in a multi-core fiber is a measure of how much power leaks from one core to another, adjacent core. As used herein, the term "adjacent core" refers to the core that is nearest to the reference core. In embodiments, all cores may be equally spaced from one another, meaning that all cores are adjacent one another. In other embodiments, the cores may not be equally spaced from one another, meaning that some cores will be spaced further from the reference core than adjacent cores are spaced from the reference core. The crosstalk can be determined based on the coupling coefficient, which depends on the refractive index profile design of the core, the distance between the two adjacent cores, the structure of the cladding surrounding the two adjacent cores, and $\Delta\beta$, which depends on a difference in propagation constant $\beta$ values between the two adjacent cores. For two adjacent cores with power $P_1$ launched into the first core, then the power $P_2$ coupled from the first core to the second core can be determined from coupled mode theory using the following equation (5):

$$P_2 = \frac{L}{L_c}\left\langle\left(\frac{\kappa}{g}\right)^2 \sin^2(g\Delta L)\right\rangle P_1 \quad (5)$$

where $\langle \rangle$ denotes the average, L is fiber length, $\kappa$ is the coupling coefficient between the electric fields of the two cores, $\Delta L$ is the length of the fiber, $L_c$ is the correlation length, and g is given by the following equation (6):

$$g^2 = \kappa^2 + \left(\frac{\Delta\beta}{2}\right)^2 \quad (6)$$

where $\Delta\beta$ is the mismatch in propagation constants between the LP01 modes in the two adjacent cores when they are isolated. The crosstalk (in dB) is then determined using the following equation (7):

$$X = 10\log\left(\frac{P_2}{P_1}\right) = 10\log\left(\frac{L}{L_C}\left\langle\left(\frac{\kappa}{g}\right)^2\sin^2(g\Delta L)\right\rangle\right) \quad (7)$$

The crosstalk between the two adjacent cores increases linearly with fiber length in the linear scale (equation (5)) but does not increase linearly with fiber length in the dB scale (equation (7)). As used herein, crosstalk performance is referenced to a 1 km length L of optical fiber. However, crosstalk performance can also be represented with respect to alternative optical fiber lengths, with appropriate scaling. For optical fiber lengths other than 1 km, the crosstalk between cores can be determined using the following equation (8):

$$X(L) = X(100) + 10\log(L) \quad (8)$$

For example, for a 10 km length of optical fiber, the crosstalk can be determined by adding "10 dB" to the crosstalk value for a 1 km length optical fiber. For a 100 km length of optical fiber, the crosstalk can be determined by adding "20 dB" to the crosstalk value for a 1 km length of optical fiber. For long-haul transmission in an uncoupled-core multicore fiber, the crosstalk should be less than or equal to −50 dB, less than or equal to −60 dB, or even less than or equal to −70 dB. For long-haul transmission in a coupled-core multicore fiber, the crosstalk is greater than or equal to −40 dB, greater than or equal to −30 dB, greater than or equal to −20 dB, or even greater than or equal to −10 dB. If the coupling coefficient is large enough, the power can couple back and forth periodically between two cores along the fiber. In this case, the crosstalk does not scale with the fiber length, but changes periodically. The crosstalk could even reach 100%, or zero dB.

Techniques for determining crosstalk between cores in a multicore optical fiber can be found in M. Li, et al., "Coupled Mode Analysis of Crosstalk in Multicore Fiber with Random Perturbations," in Optical Fiber Communication Conference, OSA Technical Digest (online), *Optical Society of America*, 2015, paper W2A.35, and Shoichiro Matsuo, et al., "Crosstalk behavior of cores in multi-core fiber under bent condition," *IEICE Electronics Express*, Vol. 8, No. 6, p. 385-390, published Mar. 25, 2011 and Lukasz Szostkiewicz, et al., "Cross talk analysis in multicore optical fibers by supermode theory," *Optics Letters*, Vol. 41, No. 16, p. 3759-3762, published Aug. 15, 2016, the contents of which are all incorporated herein by reference in their entirety.

The phrase "coupling coefficient" $\kappa$, as used herein, is related to the overlap of electric fields when the two cores are close to each other. The square of the coupling coefficient, $\kappa^2$, is related to the average power in core m as influenced by the power in other cores in the multicore optical fiber. The "coupling coefficient" can be estimated using the coupled power theory, with the methods disclosed in M. Koshiba, K. Saitoh, K. Takenaga, and S. Matsuo, "Analytical Expression of Average Power-Coupling Coefficients for Estimating Intercore Crosstalk in Multicore Fibers," IEEE Photonics J., 4(5), 1987-95 (2012); and T. Hayashi, T. Sasaki, E. Sasaoka, K. Saitoh, and M. Koshiba, "Physical Interpretation of Intercore Crosstalk in Multicore Fiber: Effects of Macrobend, Structure Fluctuation, and Microbend," Optics Express, 21(5), 5401-12 (2013), the contents of which are incorporated by reference herein in their entirety.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The present description provides a coupled-core multicore optical fiber having a plurality of cores that are doped with alkali metals or chlorine to achieve low attenuation and a large effective area. The cores may be embedded in an inner (or common inner) cladding region that may be fluorine doped, which may be surrounded by an outer (or common outer) cladding, which may also be fluorine doped, with a total diameter of 125 µm or greater, such as for example about 200 µm. For instance, the total diameter may be greater than or equal to 125 µm and less than or equal to 180 µm. In other embodiments, the cores may be doped with chlorine, either with the alkali metals described above or without the alkali metals.

Coupled-core multicore optical fiber is distinct from uncoupled-core multicore optical fiber. In the uncoupled variety, the cores are meant to be spatially isolated from one another to limit crosstalk between the cores. Coupled-core multicore optical fibers, however, take advantage of crosstalk between the cores. As a result, the distance between cores (i.e., the "core pitch") can be much smaller in coupled-core multicore optical fibers than in uncoupled-core multicore optical fibers, allowing for more cores per unit area of the cross section of the multicore optical fiber.

Referring now to FIG. 1, an optical system 100 comprising a coupled-core multicore optical fiber 110 with a plurality of cores $C_1$, $C_2$ (FIG. 2), a signal source 180, and a photon detector 190 is schematically depicted. The signal source 180 may produce multiple modulated signals, $S_1$ and $S_2$, such as those produced by a distributed feedback lasers (DFB) or vertical-cavity surface-emitting lasers (VCSEL). The coupled-core multicore optical fiber 110 comprises an input end 112 optically coupled to the signal source 180 and an output end 114 optically coupled to the photodetector 190 and an outer surface 116. In operation, the signal source 180 may selectively direct photons from one laser into an individual core of the plurality of cores. For example, the signal source 180, the input end 112 of the coupled-core multicore optical fiber 110, or both, may be coupled to a multicore fan-in device, which is configured to align the signal source 180 with any individual core of the plurality of cores. For example, the signal $S_1$ from signal source 180 may be aligned with the core $C_1$ (FIG. 2) of the coupled-core multicore optical fiber 110 and may direct a plurality of photons into the core $C_1$, and the signal $S_2$ from signal source 180 may be aligned with the core $C_2$ (FIG. 2) of the coupled-core multicore optical fiber 110 and may direct a plurality of photons into the core $C_2$.

Figure 2:
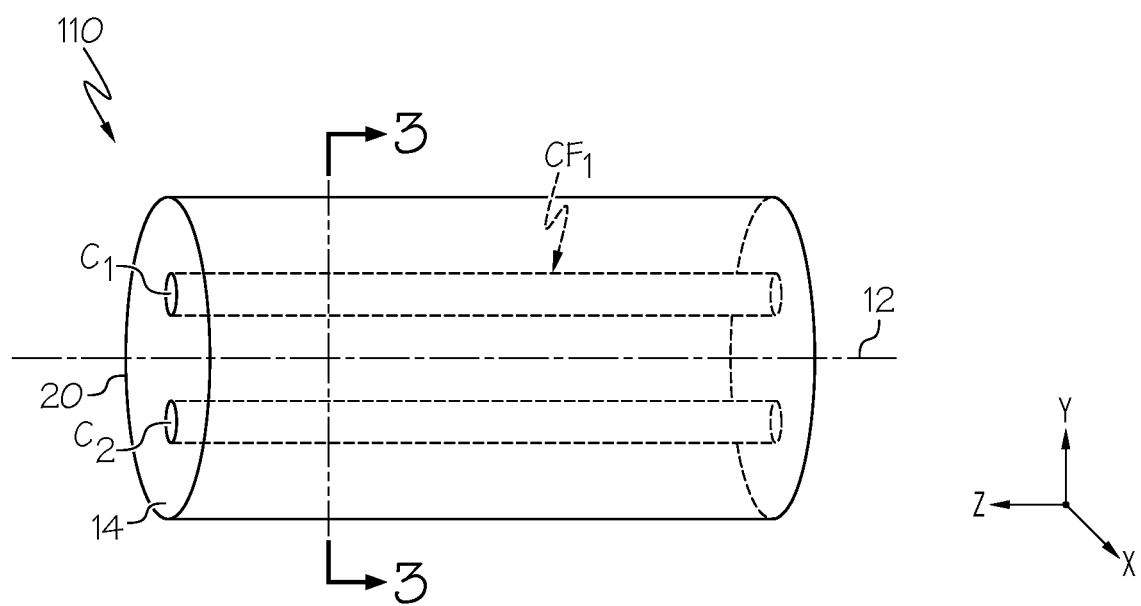
FIG. 2 schematically depicts a multicore optical fiber, according to one or more embodiments shown and described herein.
Figure 3:
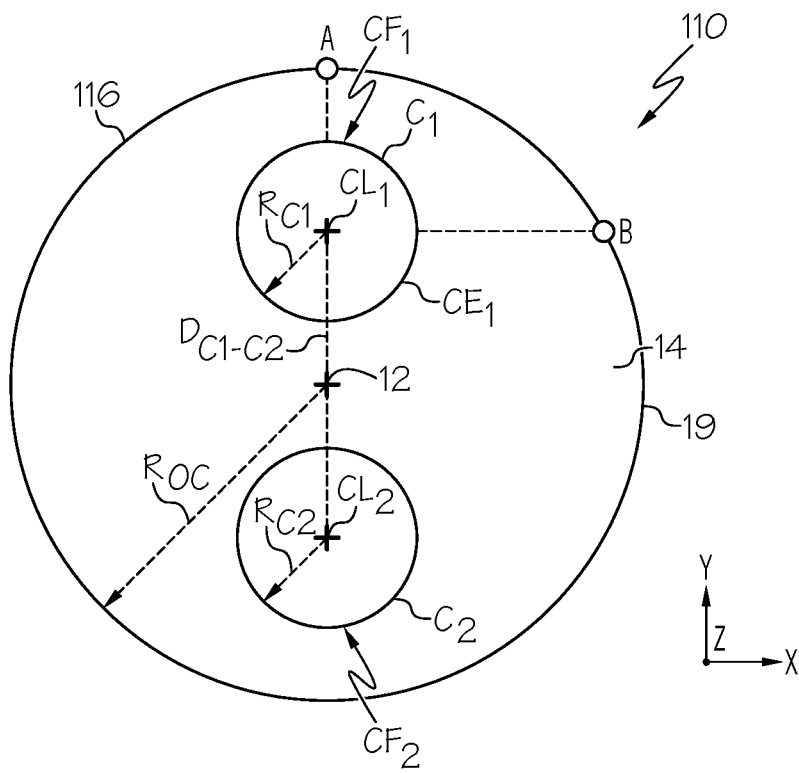
FIG. 3 schematically depicts an X-Y cross-section of the multicore optical fiber of FIG. 2 taken along the line 3-3, according to one or more embodiments shown and described herein.

FIGS. 2 and 3 illustrate an isometric view of a section of a coupled-core multicore optical fiber 110 and a cross-sectional view of the coupled-core multicore optical fiber 110 along section 3-3 of FIG. 2, respectively. The coupled-core multicore optical fiber 110 includes a central fiber axis 12 (the centerline of the coupled-core multicore optical fiber 110, which defines radial position R=0) and a cladding matrix 14 defining a common cladding 19. The common cladding 19 can have an outer radius $R_{CC}$, which in the illustrated embodiment of FIGS. 2 and 3 corresponds to the outer radius of the coupled-core multicore optical fiber 110. A plurality of cores $C_i$ (individually denoted $C_1$ and $C_2$ in the example of FIGS. 2 and 3 and collectively referred to as cores "C") are disposed within the cladding matrix 14, with each core $C_i$ forming a core fiber $CF_i$ that generally extends through a length of the coupled-core multicore optical fiber 110 parallel to the central fiber axis 12. With reference to FIG. 3, each core $C_1$ and $C_2$ includes a central axis or centerline $CL_1$ and $CL_2$ (which define radial position r=0 for each core) and an outer radius $r_{C1}$ and $r_{C2}$, respectively. A position of each of the centerlines $CL_1$ and $CL_2$ within the coupled-core multicore optical fiber 110 can be defined using Cartesian coordinates with the central fiber axis 12 defining the origin (0,0) of an x-y coordinate system coincident with the coordinate system defined by the radial coordinate R. The position of centerline $CL_1$ can be defined as $(x_1, y_1)$ and the position of centerline $CL_2$ can be defined as $(x_2, y_2)$. A distance $D_{C1-C2}$ between the centerlines $CL_1$ and $CL_2$ can then be defined as $\sqrt{[(x_2-x_1)^2+(y_2-y_1)^2]}$, and may be referred to herein as "core pitch." Thus, for a given core $C_i$ having a centerline $CL_i$ and an adjacent core $C_j$ having a centerline $CL_j$, a distance $D_{Ci-Cj}$ is defined as $\sqrt{[(x_j-x_i)^2+(y_j-y_i)^2]}$. The plurality of cores $C_i$ may also be spaced apart from the central fiber axis 12 by a predetermined distance $D_{12-Ci}$ as measured from the central fiber axis 12 to the centers $CL_i$ of each of the plurality of cores $C_i$. The plurality of cores $C_i$ may also be spaced apart from the outer surface 116 of the coupled-core multicore optical fiber 110 by a predetermined distance $D_{CEi-116}$ as measured from the edge $CE_i$ of each of the plurality of cores $C_i$ to the outer surface 116. The $D_{CEi-116}$ may be composed of a range of values depending on the symmetry of the arrangement of each of the plurality of cores Ci within the coupled-core multicore optical fiber 110. For instance, the distance between $CE_1$ and point A on outer surface 116 of coupled-core multicore optical fiber 110 of FIG. 3 is much smaller than the distance between $CE_1$ and point B. Without intending to be bound by any particular theory, it is believed that the extent of signal loss due to tunneling is dependent upon the minimum value for $D_{CEi-116}$.

In embodiments, the multicore optical fiber can have a circular cross-section shape with seven cores, wherein six of the cores are at the vertices of a hexagon and the seventh core is at the center of the circular cross-section. In some embodiments, the multicore optical fiber of the present disclosure can have a circular cross-section and the cores can be arranged in a 2×2 configuration. In still other embodiments, the multicore optical fiber of the present disclosure can have a circular cross-section and the number of cores can be between 10 and 20. The coupled-core multicore optical fiber 110 can have N number of total cores $C_i$, wherein i=1 . . . N and N is at least 2. According to one aspect of the present disclosure, the total number N of cores $C_i$ in the multicore optical fiber 10 is from 2 to 20, 2 to 18, 2 to 16, 2 to 12, 2 to 10, 2 to 8, 2 to 6, 2 to 4, 2 to 3, 4 to 20, 4 to 18, 4 to 16, 4 to 12, 4 to 10, 4 to 8, 4 to 6, 6 to 20, 6 to 18, 6 to 16, 6 to 12, 6 to 10, 6 to 8, 8 to 20, 8 to 18, 8 to 16, 8 to 12, 8 to 10, 10 to 20, 10 to 18, 10 to 16, 10 to 12, 12 to 20, 12 to 18, or 12 to 16. For example, the total number N of cores $C_i$ in the multicore optical fiber 10 can be 2, 3, 4, 5, 6, 7, 8, 9, 10, 11, 12, 13, 14, 15, 16, 17, 18, 19, 20, or any total number N of cores $C_i$ between any of these values. The total number N of cores $C_i$ can be even or odd and can be arranged in any pattern within the cladding matrix 14, non-limiting examples of which include a 2×2 pattern (or multiples thereof; see, e.g., FIGS. 5A and 5B, discussed below), a square pattern, a rectangular pattern, a circular pattern, and a hexagonal lattice pattern. For example, the multicore optical fiber 10 can have N=7 cores $C_i$ arranged in a hexagonal lattice pattern. In another example, the multicore optical fiber 10 can have N=12 cores $C_i$ arranged in a circular pattern. In one example, the coupled-core multicore optical fiber 110 can have a core $C_i$ positioned such that the core centerline $CL_i$ aligns with the central fiber axis 12. In another example, the coupled-core multicore optical fiber 110 can have a core $C_i$ pattern such that the cores $C_i$ are spaced around the central fiber axis 12.

Figure 4:
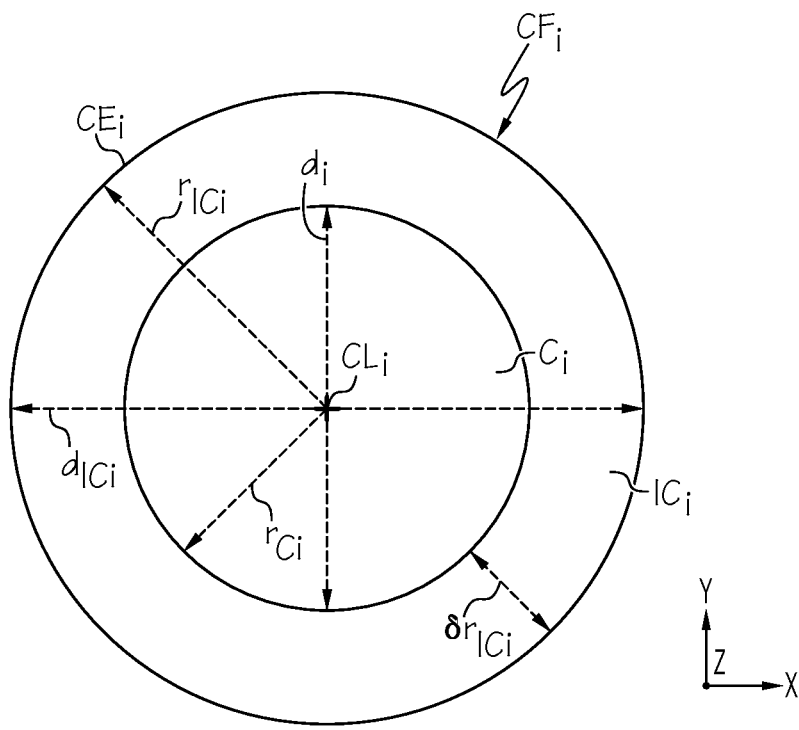
FIG. 4 schematically depicts an X-Y cross-section of an exemplary core and inner cladding of a multicore optical fiber, according to one or more embodiments shown and described herein.

Referring now to FIG. 4, according to embodiments, one or more of the plurality of cores $C_i$ of the coupled-core multicore optical fiber 110 can optionally be surrounded by an inner cladding $IC_i$. The inner cladding, when included, may help increase coupling and crosstalk between adjacent cores. Each inner cladding $IC_i$ has an outer radius $r_{ICi}$ and an inner radius that corresponds to the outer radius $r_{Ci}$ of the core $C_i$. The inner cladding $IC_i$ has a width $\delta r_{Ci}$ defined by the outer radius $r_{Ci}$ of the core $C_i$ and the outer radius $r_{ICi}$ of the inner cladding $IC_i$. The core $C_i$ can include a diameter $d_i$ corresponding to $2*r_{Ci}$ and the inner cladding $IC_i$ can include a diameter $d_{ICi}$ corresponding to $2*r_{ICi}$. The diameter $d_{ICi}$ also corresponds to the diameter of core fiber $CF_i$.

Figure 5A:
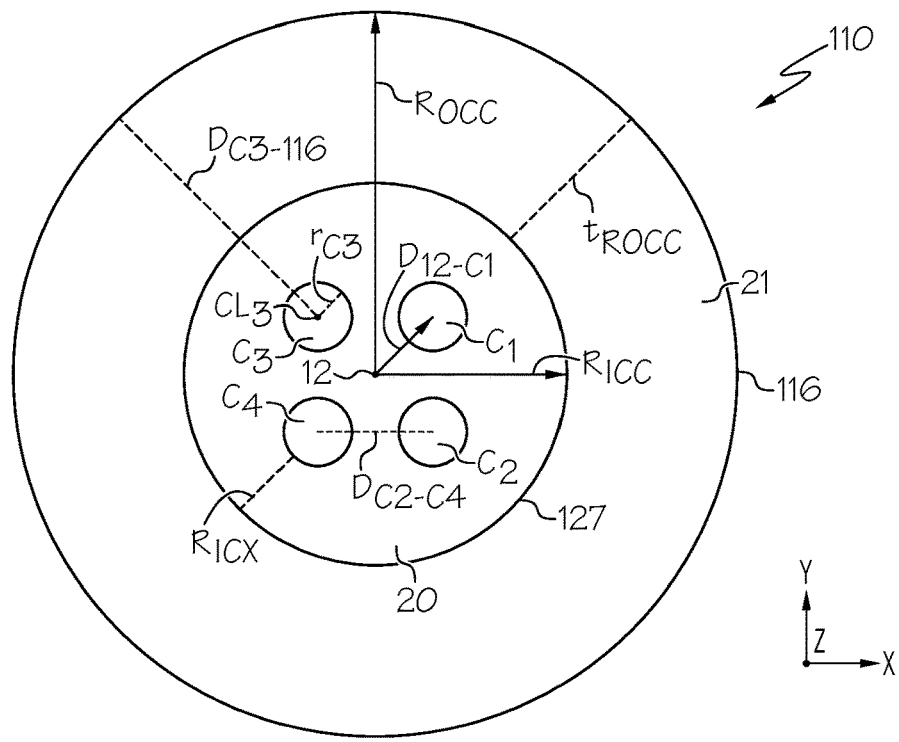
FIG. 5A schematically depicts an X-Y cross-section of an alternative multicore optical fiber of FIG. 2 along section 3-3 having four cores, a common inner cladding, and a common outer cladding according to one or more embodiments shown and described herein.

Referring now to FIG. 5A, which depicts an X-Y cross-section of an embodiment of the coupled-core multicore optical fiber 110 in which coupled-core multicore optical fiber 110 comprises four cores $C_1$, $C_2$, $C_3$, $C_4$ disposed in a common cladding. In this embodiment, the common cladding is an inner common cladding 20 having an outer radius $R_{ICC}$. The inner common cladding 20 surrounds each core of the plurality of cores (i.e., cores $C_1$, $C_2$, $C_3$, $C_4$), each core having a radius $r_{C1}$, $r_{C2}$, $r_{C3}$, $r_{C4}$, respectively. The inner common cladding 20 is in turn disposed in an outer common cladding 21 having an outer radius $R_{OCC}$; the outer radius $R_{OCC}$ also represents the outer radius of the entire glass portion of the coupled-core multicore optical fiber 110. Accordingly, it should be understood that the outer radius $R_{ICC}$ of the inner common cladding 20 is less than the radius $R_{OCC}$ of the outer common cladding 21. It should be understood that what is depicted in the figures is the "glass portion" of the optical fiber. One or more coatings may be disposed around the glass portion (i.e., around the outer common cladding 21). The coating(s) may be used to protect the glass of the coupled-core multicore optical fiber 110. Further, the coating(s) may also be used to enhance the optical properties of the coupled-core multicore optical fiber 110. Outer common cladding 21 may have a radial thickness $t_{ROCC}$ that extends from the outer surface 127 of the inner common cladding 20 to the outer surface 116 of the coupled-core multicore optical fiber 110. The cores $C_1$, $C_2$, $C_3$, $C_4$ are distributed within the inner common cladding 20 so as to have a core pitch $D_{Ci-Cj}$. The term "core pitch", as used herein, refers to the distance between the centers $CL_i$, $CL_j$ of two adjacent cores $C_i$, $C_j$ (i.e., the center-to-center spacing between two adjacent cores). The cores $C_1$, $C_2$, $C_3$, $C_4$ may also be spaced apart from the central fiber axis 12 by a predetermined distance $D_{12-Ci}$, where each $D_{12-Ci}$ is measured from the central fiber axis 12 to the centers $CL_1$, $CL_2$, $CL_3$, $CL_4$ of each of the cores $C_1$, $C_2$, $C_3$, $C_4$, respectively.

In embodiments, the radius $R_{ICC}$ of the inner common cladding 20 may be greater than or equal to 20 μm and less than or equal to 45 μm or greater than or equal to 25 μm and less than or equal to 40 μm or greater than or equal to 20 μm and less than or equal to 30 μm or greater than or equal to 30 μm and less than or equal to 35 μm or even greater than or equal to 35 μm and less than or equal to 45 μm. It should be understood that the radius $R_{ICC}$ may be within a range formed from any one of the lower bounds for the radius $R_{ICC}$ and any one of the upper bounds of the radius $R_{ICC}$ described herein.

In the same or alternative embodiments, the radius $r_{Ci}$ of each core $C_i$ may be greater than or equal to 3 μm and less than or equal to 10 μm or greater than or equal to 4 μm and less than or equal to 9 μm or greater than or equal to 4 μm and less than or equal to 8 μm or greater than or equal to 4 μm and less than or equal to 7 μm or greater than or equal to 4 μm and less than or equal to 6 μm or greater than or equal to 4 μm and less than or equal to 5 μm or greater than or equal to 5 μm and less than or equal to 7 μm or even greater than or equal to 6 μm and less than or equal to 7 μm. It should be understood that the radius $r_{Ci}$ may be within a range formed from any one of the lower bounds for the radius $r_{Ci}$ and any one of the upper bounds of the radius $r_{Ci}$ described herein.

Still referring to FIG. 5A, in embodiments, $R_{ICX}$ may be defined as $R_{ICC} - D_{12-Ci} - r_{Ci}$ and is the distance between the edge of core $C_i$ and the edge of the inner common cladding 20 as defined by the radius $R_{ICC}$ along a line formed from the center $CL_i$ of the core and the central fiber axis 12. In embodiments, $R_{ICX}$ may be greater than or equal to 15 μm and less than or equal to 30 μm or greater than or equal to 16 μm and less than or equal to 29 μm or greater than or equal to 17 μm and less than or equal to 28 μm or greater than or equal to 18 μm and less than or equal to 27 μm or greater than or equal to 19 μm and less than or equal to 26 μm or greater than or equal to 20 μm and less than or equal to 25 μm or greater than or equal to 21 μm and less than or equal to 24 μm or even greater than or equal to 22 μm and less than or equal to 23 μm. It should be understood that $R_{ICX}$ may be within a range formed from any one of the lower bounds for the radius $R_{ICX}$ and any one of the upper bounds of the radius $R_{ICX}$ described herein.

Figure 5B:
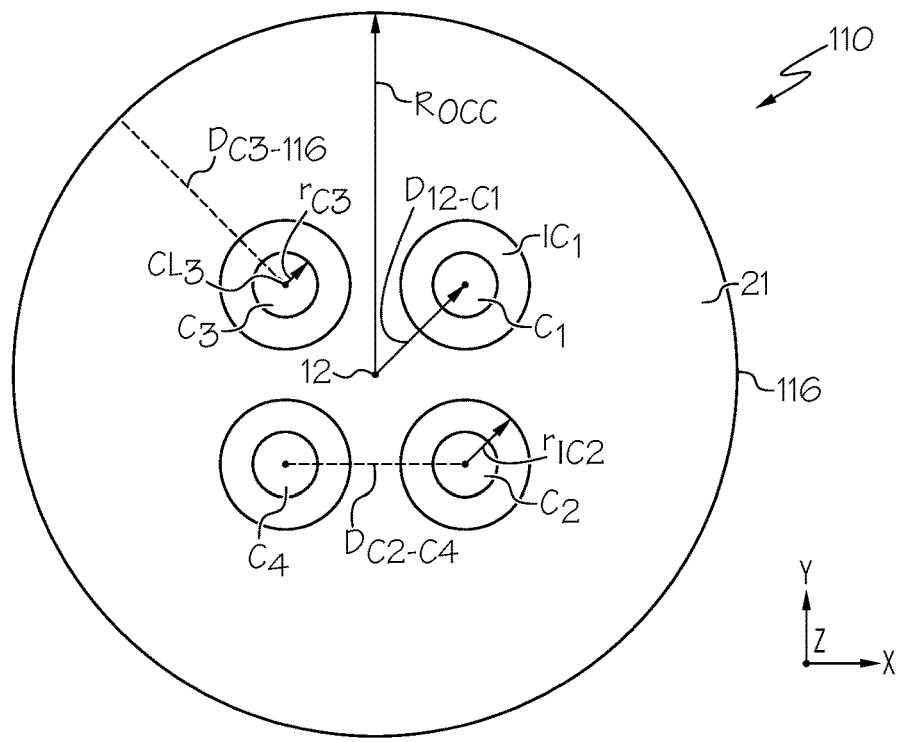
FIG. 5B schematically depicts an X-Y cross-section of an alternative multicore optical fiber of FIG. 2 along section 3-3 having four cores, four inner claddings, and a common outer cladding according to one or more embodiments shown and described herein.

Referring now to FIG. 5B, which depicts an X-Y cross-section of an embodiment of the coupled-core multicore optical fiber 110 in which coupled-core multicore optical fiber 110 comprises four cores $C_1$, $C_2$, $C_3$, $C_4$, each surrounded by an individual inner cladding $IC_i$ and disposed in an outer common cladding 21. Each core of the plurality of cores (i.e., cores $C_1$, $C_2$, $C_3$, $C_4$) has radius $r_{C1}$, $r_{C2}$, $r_{C3}$, $r_{C4}$, respectively, and each inner cladding of the plurality of inner claddings has radius $r_{IC1}$, $r_{IC2}$, $r_{IC3}$, $r_{IC4}$, respectively. Each of the plurality of cores is disposed in an outer common cladding 21 having an outer radius $R_{OCC}$; the outer radius $R_{OCC}$ also represents the outer radius of the entire glass portion of the coupled-core multicore optical fiber 110. It should be understood that what is depicted in the figures is the "glass portion" of the optical fiber. One or more coatings may be disposed around the glass portion (i.e., around the outer common cladding 21). The coating(s) may be used to protect the glass of the coupled-core multicore optical fiber 110. Further, the coating(s) may also be used to enhance the optical properties of the coupled-core multicore optical fiber 110. The cores $C_1$, $C_2$, $C_3$, $C_4$ are distributed within the common cladding 21 so as to have a core pitch $D_{Ci-Cj}$. The term "core pitch", as used herein, refers to the distance between the centers $CL_i$, $CL_j$ of two adjacent cores $C_i$, $C_j$ (i.e., the center-to-center spacing between two adjacent cores). The cores $C_1$, $C_2$, $C_3$, $C_4$ may also be spaced apart from the central fiber axis 12 by a predetermined distance $D_{12-Ci}$, where each $D_{12-Ci}$ is measured from the central fiber axis 12 to the centers $CL_1$, $CL_2$, $CL_3$, $CL_4$ of each of the cores $C_1$, $C_2$, $C_3$, $C_4$, respectively.

In the same or alternative embodiments, the radius $r_{ICi}$ of each inner cladding $IC_i$ (depicted in FIG. 4) may be greater than or equal to 8 μm and less than or equal to 16 μm or greater than or equal to 9 μm and less than or equal to 15 μm or greater than or equal to 10 μm and less than or equal to 14 μm or even greater than or equal to 11 μm and less than or equal to 13 μm. It should be understood that the radius $r_{ICi}$ may be within a range formed from any one of the lower bounds for the radius $r_{ICi}$ and any one of the upper bounds of the radius $r_{ICi}$ described herein.

Figure 6A:
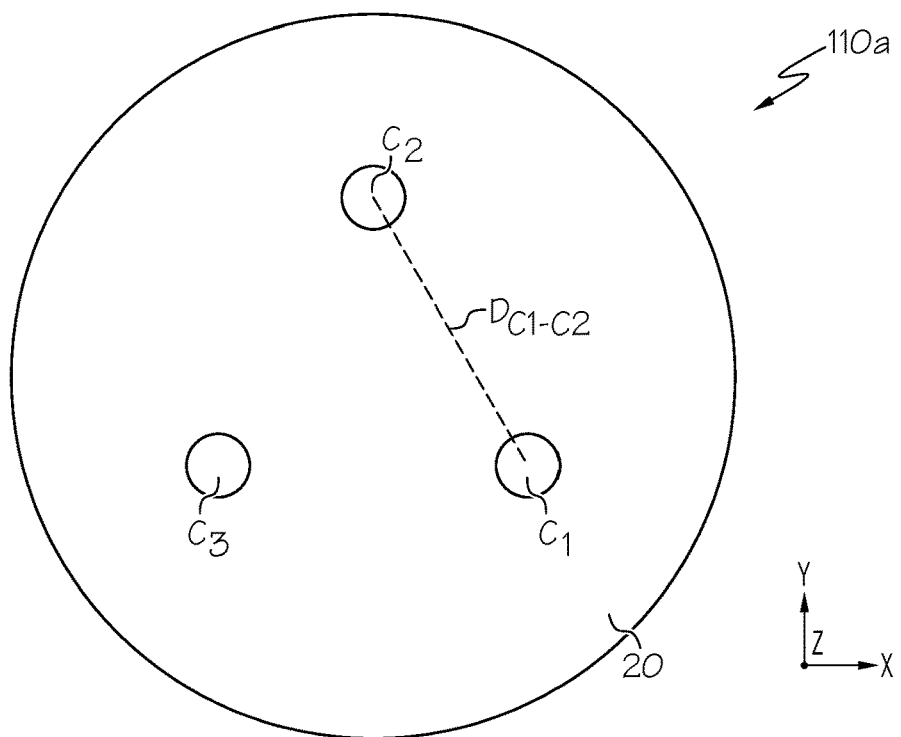
FIG. 6A schematically depicts an X-Y cross-section of an alternative multicore optical fiber of FIG. 2 along section 3-3 having three cores, according to one or more embodiments shown and described herein.
Figure 6B:
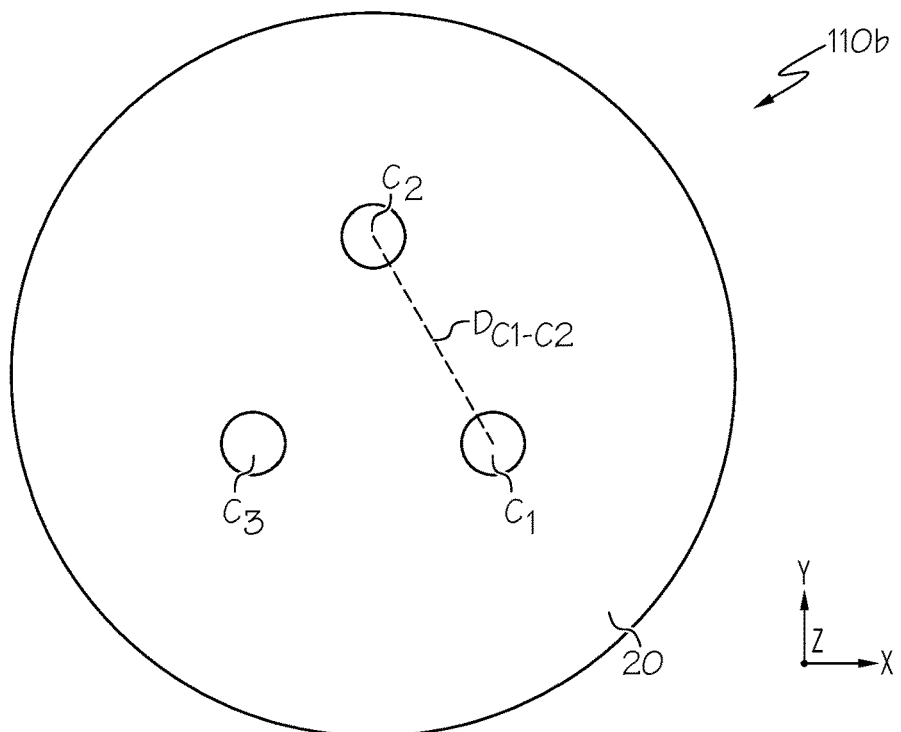
FIG. 6B schematically depicts an X-Y cross-section of an alternative multicore optical fiber of FIG. 2 along section 3-3 having three cores, according to one or more embodiments shown and described herein.
Figure 6C:
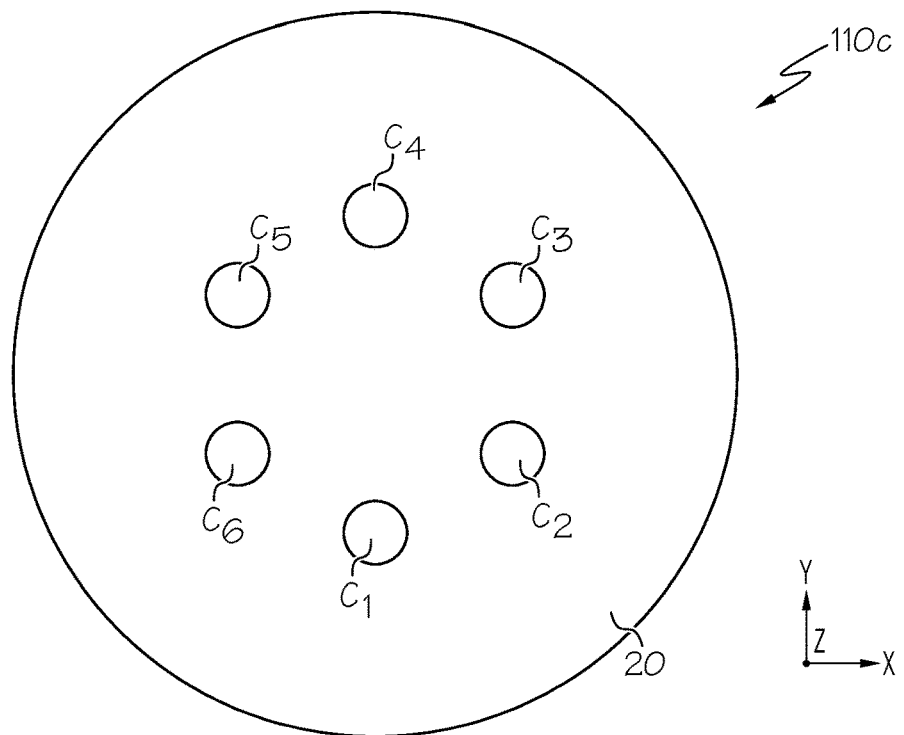
FIG. 6C schematically depicts an X-Y cross-section of an alternative multicore optical fiber of FIG. 2 along section 3-3 having six cores, according to one or more embodiments shown and described herein.
Figure 6D:
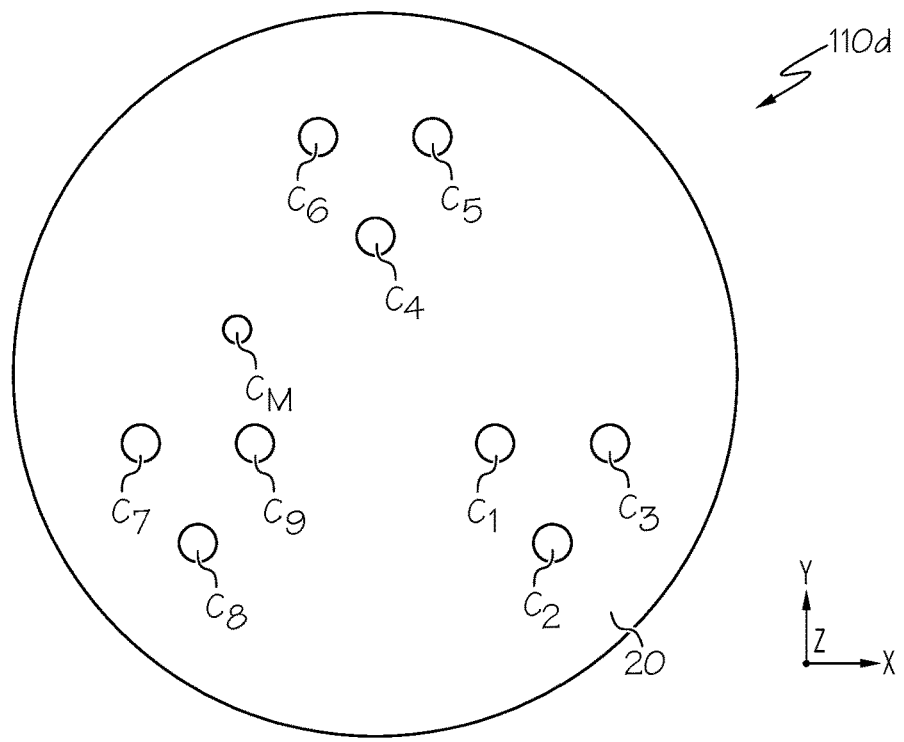
FIG. 6D schematically depicts an X-Y cross-section of an alternative multicore optical fiber of FIG. 2 along section 3-3 having three clusters of three cores, according to one or more embodiments shown and described herein.

While FIGS. 5A and 5B depicts a coupled-core multicore optical fiber 110 having four cores $CL_1$, $CL_2$, $CL_3$, $CL_4$, it should be understood that other arrangements are contemplated and possible. For example and without limitation, FIGS. 6A-6D show alternative embodiments of coupled-core multicore optical fiber 110 core layouts with each of the plurality of cores $CL_i$ distributed in the common cladding 21. In particular, FIG. 6A shows a coupled-core multicore optical fiber 110a having three cores $C_1$, $C_2$, $C_3$. In this embodiment, the coupled-core multicore optical fiber 110a may have a core pitch $D_{Ci-Cj}$ of, for example and without limitation, 38 micrometers (μm). FIG. 6B shows a coupled-core multicore optical fiber 110b having three cores $C_1$, $C_2$, $C_3$. In this embodiment, the coupled core multicore optical fiber 110b may have a core pitch $D_{Ci-Cj}$ of, for example and without limitation, 29 μm. FIG. 6C shows a coupled-core multicore optical fiber 110c having six cores $C_1$, $C_2$, $C_3$, $C_4$, $C_5$, $C_6$ arranged in a hexagonal configuration. Hybrid designs with clusters of two or more closely-coupled cores $C_i$, $C_j$ distributed in the common cladding 21 are also contemplated and possible. For example, FIG. 6D shows a coupled-core multicore optical fiber 110d having three clusters of three cores $C_1$, $C_2$, $C_3$, $C_4$, $C_5$, $C_6$, $C_7$, $C_8$, $C_9$ with each cluster of cores arranged in a triangular configuration. The embodiment shown in FIG. 6D also includes a tenth marker core, $C_M$, which does not transmit data but can facilitate optical alignment of the MCF during splicing and connectorization. It should be understood that the foregoing examples are intended to be illustrative, not limiting, and many other arrangements of the cores of the coupled-core multicore optical fibers are contemplated and possible.

In embodiments, the core $C_i$ may include alkali-doped silica glass, with the inner cladding $IC_i$ doped with fluorine to provide an index differential between the core and the common cladding layer. The alkali-doped silica glass of the core Ci may include for example, concentrations of alkali metal oxide from 20 ppm to 1000 ppm, from 50 ppm to 600 ppm, or even from 110 ppm to 200 ppm. The alkali may include, for example, oxides of sodium, potassium, rubidium, lithium, cesium, or a combination of two or more of these. In some embodiments, the core comprises more than one alkali doped in the core.

In embodiments, the silica-based glass of each of the plurality of cores $C_i$ may comprise silica-based glass doped with one or more alkali metal oxides selected from $K_2O$, $Na_2O$, $Li_2O$, $Cs_2O$, $Rb_2O$, and mixtures thereof. Without intending to be bound by any particular theory, it is believed that including alkali metal oxides as dopants in each of the plurality of cores $C_i$ may reduce the viscosity of the glass at elevated temperatures which, in turn, aids relaxation by mitigating the development of stress in the glass during drawing. The mitigation of stress in the glass decreases the attenuation of the glass. However, if the glass is doped with too much alkali, the concentration fluctuation contribution to Rayleigh scattering may be increased, leading to an increased observed attenuation. Further, in embodiments in which the silica-based glass is co-doped with both alkali metal oxides and germania, undesirable crystallization may occur.

In embodiments including the alkali metal oxide, the concentration of the alkali metal oxide in each of the plurality of cores $C_i$ may be greater than or equal to 20 ppm and less than or equal to 1000 ppm by weight (0.1 wt. %) of each of the plurality of cores $C_i$. For example, the concentration of alkali metal oxide may be greater than or equal to 50 ppm (0.005 wt. %) and less than or equal to 950 ppm (0.095 wt. %) or greater than or equal to 100 ppm (0.01 wt. %) and less than or equal to 900 ppm (0.09 wt. %) or greater than or equal to 150 ppm (0.015 wt. %) and less than or equal to 850 ppm (0.085 wt. %) or greater than or equal to 200 ppm (0.02 wt. %) and less than or equal to 800 ppm (0.08 wt. %) or greater than or equal to 250 ppm (0.025 wt. %) and less than or equal to 750 ppm (0.075 wt. %) or greater than or equal to 300 ppm (0.03 wt. %) and less than or equal to 700 ppm (0.07 wt. %) or greater than or equal to 350 ppm (0.035 wt. %) and less than or equal to 650 ppm (0.065 wt. %) or greater than or equal to 400 ppm (0.04 wt. %) and less than or equal to 600 ppm (0.06 wt. %) or even greater than or equal to 450 ppm (0.045 wt. %) and less than or equal to 550 ppm (0.055 wt. %). It should be understood that the amount of alkali metal oxide in the silica-based glass may be within a range formed from any one of the lower bounds for alkali metal oxide and any one of the upper bounds of alkali metal oxide described herein.

In the same or different embodiments, the silica-based glass of each of the plurality of cores $C_i$ may comprise silica-based glass doped with fluorine. Fluorine is a down-dopant that reduces the index of refraction of each of the plurality of cores $C_i$ relative to undoped silica. In some embodiments, the concentration of fluorine in each of the plurality of cores $C_i$ is greater than or equal to 0.02 wt. % and less than or equal to 0.15 wt. % by weight of the fully formed core $C_i$. For example, the concentration of fluorine in each of the plurality of cores $C_i$ may be greater than or equal to 0.04 wt. % and less than or equal to 0.13 wt. %, greater than or equal to 0.06 wt. % and less than or equal to 0.11 wt. %, or even greater than or equal to 0.08 wt. % and less than or equal to 0.09 wt. %. It should be understood that the amount of fluorine in the compositions may be within a range formed from any one of the lower bounds for fluorine and any one of the upper bounds of fluorine described herein.

In embodiments, the silica-based glass of each of the plurality of cores $C_i$ may comprise silica-based glass doped with chlorine. Chlorine is an up-dopant that increases the index of refraction of each of the plurality of cores $C_i$ relative to undoped silica. In some embodiments, the concentration of the chlorine in each of the plurality of cores $C_i$ is greater than or equal to 1 wt. % and less than or equal to 7 wt. % by weight of each of the plurality of cores $C_i$. For example, the concentration of chlorine may be greater than or equal to 1.5 wt. % and less than or equal to 7 wt. %, greater than or equal to 2 wt. % and less than or equal to 6.5 wt. %, greater than or equal to 2.5 wt. % and less than or equal to 6 wt. %, greater than or equal to 3 wt. % and less than or equal to 5.5 wt. %, greater than or equal to 3.5 wt. % and less than or equal to 5 wt. %, or even greater than or equal to 4 wt. % and less than or equal to 4.5 wt. %. It should be understood that the amount of chlorine in the compositions may be within a range formed from any one of the lower bounds for chlorine and any one of the upper bounds of chlorine described herein.

In embodiments, the silica-based glass of each of the plurality of cores $C_i$ may comprise silica-based glass doped with phosphorus. Phosphorus is an up-dopant that increases the index of refraction of each of the plurality of cores $C_i$ relative to undoped silica. In embodiments in which the phosphorus is present, the concentration of phosphorus in each of the plurality of cores $C_i$ is greater than 0 wt. % and less than or equal to 2 wt. % or greater than or equal to 0.2 wt. % and less than or equal to 1.8 wt. % or greater than or equal to 0.4 wt. % and less than or equal to 1.6 wt. % or greater than or equal to 0.6 wt. % and less than or equal to 1.4 wt. % or greater than or equal to 0.8 wt. % and less than or equal to 1.2 wt. % or even greater than or equal to 1 wt. % and less than or equal to 1.1 wt. %. It should be understood that the amount of phosphorus in the compositions may be within a range formed from any one of the lower bounds for phosphorus and any one of the upper bounds of phosphorus described herein.

In embodiments, the silica-based glass of each of the plurality of cores $C_i$ may comprise silica-based glass doped with phosphorus and one or more alkali metal oxides. In embodiments, the silica-based glass of each of the plurality of cores $C_i$ may comprise silica-based glass doped with phosphorus and chlorine. In embodiments in which both phosphorus and chlorine are present, the concentration of chlorine may be greater than or equal to 1 wt. % to less than or equal to 6.5 wt. %, and the concentration of phosphorus may be greater than or equal to 0.5 wt. % and less than or equal to 2 wt. %. For example, the concentration of chlorine may be greater than or equal to 1.5 wt. % and less than or equal to 6 wt. % or greater than or equal to 2 wt. % and less than or equal to 5.5 wt. % or greater than or equal to 2.5 wt. % and less than or equal to 5 wt. % or greater than or equal to 3 wt. % and less than or equal to 4.5 wt. % or even greater than or equal to 3.5 wt. % and less than or equal to 4 wt. %. It should be understood that the amount of chlorine in the compositions may be within a range formed from any one of the lower bounds for chlorine and any one of the upper bounds of chlorine described herein. Further, the concentration of phosphorus may be greater than or equal to 0.6 wt. % and less than or equal to 1.9 wt. % or greater than or equal to 0.7 wt. % and less than or equal to 1.8 wt. % or greater than or equal to 0.8 wt. % and less than or equal to 1.7 wt. % or greater than or equal to 0.9 wt. % and less than or equal to 1.6 wt. % or greater than or equal to 1 wt. % and less than or equal to 1.5 wt. % or greater than or equal to 1.1 wt. % and less than or equal to 1.4 wt. % or even greater than or equal to 1.2 wt. % and less than or equal to 1.3 wt. %. It should be understood that the amount of phosphorus in the compositions may be within a range formed from any one of the lower bounds for phosphorus and any one of the upper bounds of phosphorus described herein.

When present, the inner common cladding 20 may comprise silica-based glass. In embodiments, the inner common cladding 20 may consist of, or consist essentially of, silica-based glass. In embodiments, the silica-based glass of the inner common cladding 20 may comprise a down-dopant such that the inner common cladding 20 has an index of refraction lower than that of each of the plurality of cores $C_i$. In embodiments, the down-dopant is fluorine.

In some embodiments, inner common cladding 20, when present, may include fluorine in a concentration greater than or equal to 0.5 wt. % and less than or equal to 1.8 wt. %. For example, the inner common cladding 20 may include fluorine in a concentration greater than or equal to 0.6 wt. % and less than or equal to 1.7 wt. % or greater than or equal to 0.7 wt. % and less than or equal to 1.6 wt. % or greater than or equal to 0.8 wt. % and less than or equal to 1.5 wt. % or greater than or equal to 0.9 wt. % and less than or equal to 1.4 wt. % or greater than or equal to 1 wt. % and less than or equal to 1.3 wt. % or even greater than or equal to 1.1 wt. % and less than or equal to 1.2 wt. % It should be understood that the amount of fluorine in the compositions may be within a range formed from any one of the lower bounds for fluorine and any one of the upper bounds of fluorine described herein.

The outer common cladding 21 may comprise silica-based glass. In embodiments, the outer common cladding 21 may consist of, or consist essentially of, silica-based glass. In embodiments, the silica-based glass of the outer common cladding 21 may comprise a down-dopant, such as fluorine, which reduces the index of refraction such that the outer common cladding 21 has an index of refraction lower than that of each of the plurality of cores $C_i$ and higher than that of the inner common cladding 20. In other embodiments, each of the plurality of cores $C_i$ may be undoped, the inner common cladding 20 may include a down-dopant, and the outer common cladding may include an up-dopant. Exemplary up-dopants include, but are not limited to, chlorine, germania, and titania.

In some embodiments, the concentration of fluorine in the silica-based glass of the outer common cladding 21 is greater than or equal to 0.3 wt. % and less than or equal to 1.6 wt. % of the fully formed outer common cladding 21. For example, the concentration of fluorine may be greater than or equal to 0.4 wt. % and less than or equal to 1.5 wt. % or greater than or equal to 0.7 wt. % and less than or equal to 1.4 wt. % or greater than or equal to 0.8 wt. % and less than or equal to 1.3 wt. % or greater than or equal to 0.9 wt. % and less than or equal to 1.2 wt. % or even greater than or equal to 1 wt. % and less than or equal to 1.1 wt. %. It should be understood that the amount of fluorine in the compositions may be within a range formed from any one of the lower bounds for fluorine and any one of the upper bounds of fluorine described herein.

Still referring to FIGS. 5A-5B and 6A-6D, to facilitate coupling between each of the plurality of cores $C_i$ of the coupled-core multicore optical fiber 110, the core pitch $D_{Ci-Cj}$ may be greater than or equal to 20 µm and less than or equal to 40 µm. For example, the core pitch $D_{Ci-Cj}$ may be greater than or equal to 20 µm and less than or equal to 35 µm, greater than or equal to 22 µm and less than or equal to 32 µm, greater than or equal to 24 µm and less than or equal to 30 µm, greater than or equal to 25 µm and less than or equal to 30 µm, greater than or equal to 20 µm and less than or equal to 28 µm, greater than or equal to 20 µm and less than or equal to 26 µm, greater than or equal to 30 µm and less than or equal to 40 µm, or even greater than or equal to 32 µm and less than or equal to 38 µm. It should be understood that the core pitch $D_{Ci-Cj}$ may be within a range formed from any one of the lower bounds for core pitch $D_{Ci-Cj}$ and any one of the upper bounds of core pitch $D_{Ci-Cj}$ described herein.

To minimize radiation or tunneling loss, the minimum distance $D_{Ci-116}$ from the centers $CL_i$ of each of the plurality of cores $C_i$ to the outer surface 116 of the coupled-core multicore optical fiber 110 may be greater than or equal to 30 µm in a plane perpendicular to the long axis of the coupled-core multicore optical fiber (i.e., the X-Y plane of the coordinate axes depicted in the figures), such as greater than or equal to 30 µm and less than or equal to 50 µm. For example, the distance $D_{Ci-116}$ may be greater than or equal to 32 µm and less than or equal to 48 µm, greater than or equal to 34 µm and less than or equal to 46 µm, greater than or equal to 34 µm and less than or equal to 44 µm, greater than or equal to 36 µm and less than or equal to 42 µm, greater than or equal to 30 µm and less than or equal to 40 µm, greater than or equal to 32 µm and less than or equal to 38 µm, greater than or equal to 34 µm and less than or equal to 36 µm, greater than or equal to 40 µm and less than or equal to 50 µm, greater than or equal to 42 µm and less than or equal to 48 µm, or even greater than or equal to 44 µm and less than or equal to 46 µm. It should be understood that the distance $D_{Ci-116}$ may be within a range formed from any one of the lower bounds for this distance $D_{Ci-116}$ and any one of the upper bounds of this distance $D_{Ci-116}$ described herein.

Figure 7A:
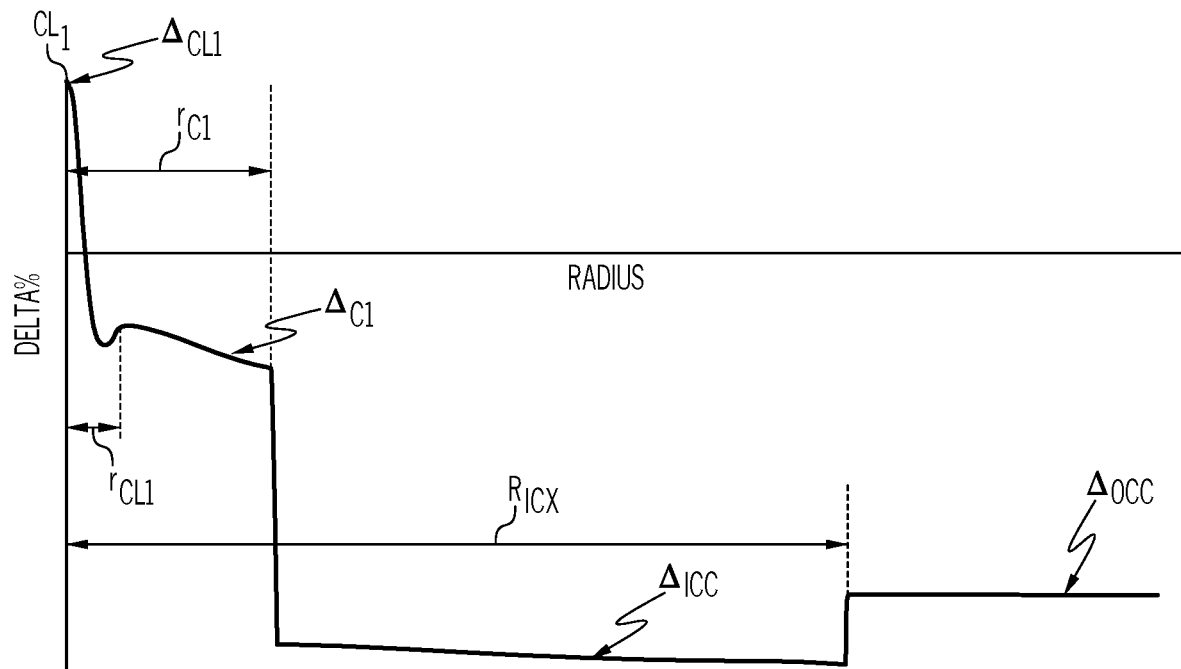
FIG. 7A graphically depicts a relative refractive index profile of a single core, inner common cladding, and outer common cladding of an optical fiber preform from which a coupled-core multicore fiber may be drawn, according to one or more embodiments shown and described herein.
Figure 7B:
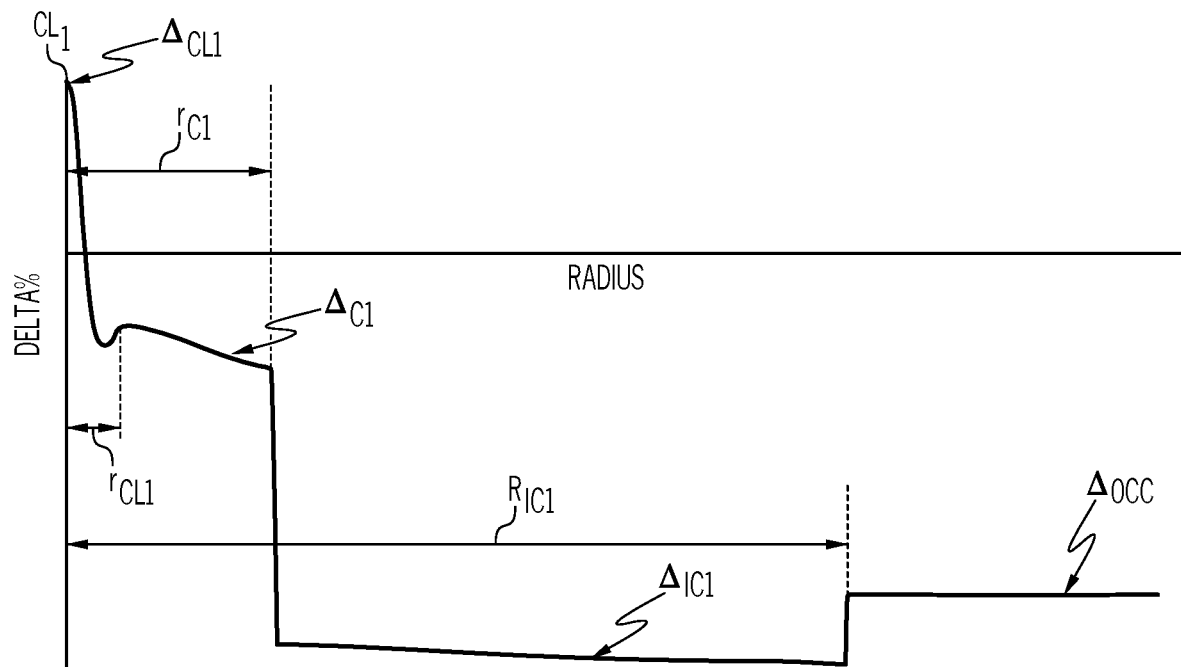
FIG. 7B graphically depicts a relative refractive index profile of a single core, inner cladding, and outer common cladding of an optical fiber preform from which a coupled-core multicore fiber may be drawn, according to one or more embodiments shown and described herein.
Figure 8:
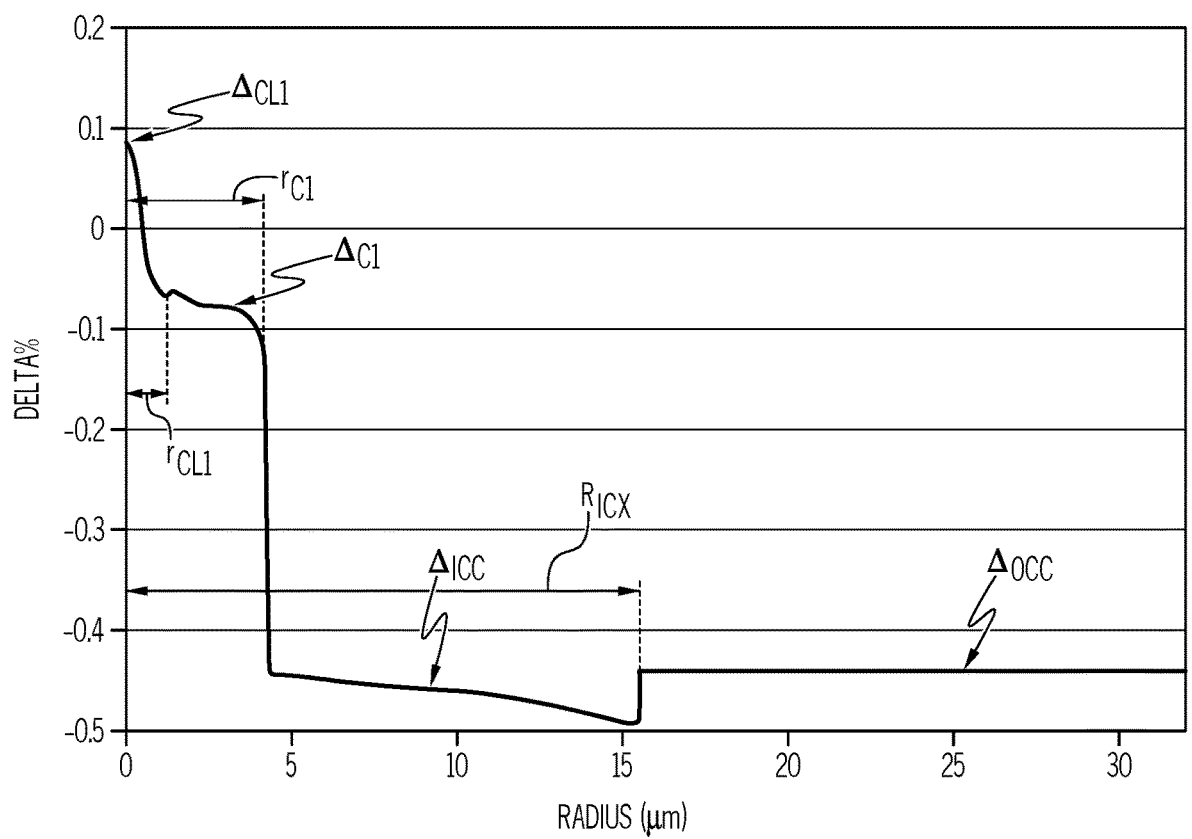
FIG. 8 graphically depicts a relative refractive index profile of a single core, inner cladding, inner common cladding, and outer common cladding of the coupled-core multicore fiber of Example 1, according to one or more embodiments shown and described herein.

Referring to FIGS. 7A, 7B, and 8, various properties of the inner common cladding 20, the outer common cladding 21, and each of the plurality of cores $C_i$ and inner claddings $IC_i$ will be described in more detail. Some properties are discussed with reference to an "individual core," $C_i$, and are applicable to any of the plurality of cores $C_i$. Other properties characterize a relationship between at least two cores $C_i$ and $C_j$. For ease of explanation and understanding, the first core $C_1$ and the second core $C_2$ are used in these descriptions. However, it should be understood that these properties may apply to any two cores of the plurality of cores $C_i$.

FIG. 7A shows a relative refractive index profile of a portion of an optical fiber preform from which a coupled-core multicore optical fiber may be drawn, such as the coupled-core multicore optical fiber depicted in FIG. 5A, according to embodiments. The relative refractive index profile of FIG. 7A is presented herein to illustrate the relative positioning of portions of a single core of the coupled-core multicore optical fiber as well as the relative refractive index of a single core of the coupled-core optical fiber. The dimensions of the Y axis and the X axis have been omitted and the variables (such as $r_{CL1}$, $r_{C1}$, $R_{ICX}$, etc.) are superimposed on the ordinates for purposes of illustration only. The horizontal axis of FIG. 7A generally corresponds to the coupled-core multicore optical fiber along a path from a center line $CL_i$ of a core $C_i$ through inner common cladding 20, and across outer common cladding 21, with center line $CL_1$ representing the r=0 value of the horizontal axis and Radius referring to radial coordinate r. The vertical axis corresponds to the relative refractive index Δ % (Delta %) as a function of the dimension of the coupled-core multicore optical fiber along the path. At center line $CL_1$, the core has a relative refractive index $\Delta_{CL1}$, relative to pure silica, and the centerline region extends to radius $r_{CL1}$. The core $C_1$ surrounds the centerline region and has a radius $r_{C1}$ with average relative refractive index $\Delta_{C1}$, relative to pure silica. Between the edge ($r_{C1}$) of the core $C_1$ and the edge of the inner common cladding ICC of the coupled-core multicore optical fiber 110, designated as $R_{ICX}$, the inner common cladding ICC has an average relative refractive index $\Delta_{ICC}$, relative to pure silica. In the embodiment shown in FIG. 7A, the inner common cladding ICC is surrounded by outer common cladding OCC, which has an average relative refractive index $\Delta_{OCC}$, relative to pure silica. In embodiments, $\Delta_{CL1} > \Delta_{C1} > \Delta_{ICC}$. In embodiments, $\Delta_{CLi} > \Delta_{C1} > \Delta_{OCC} > \Delta_{ICC}$. In embodiments, without the optional higher index inner core segment, $\Delta_{C1} > \Delta_{ICC}$. In some of these embodiments, $\Delta_{C1} > \Delta_{OCC} > \Delta_{ICC}$. The dopants may be used, as described in the preceding paragraphs, to achieve the desired differences in $\Delta_{CL1}$, $\Delta_{C1}$, and $\Delta_{ICC}$.

FIG. 7B shows a relative refractive index profile of a portion of an optical fiber preform from which a coupled-core multicore optical fiber may be drawn, such as the coupled-core multicore optical fiber depicted in FIG. 5B, according to embodiments. The relative refractive index profile of FIG. 7B is presented herein to illustrate the relative positioning of portions of a single core of the coupled-core multicore optical fiber as well as the relative refractive index of a single core of the coupled-core optical fiber. The dimensions of the Y axis and the X axis have been omitted and the variables (such as $r_{CL1}$, $r_{C1}$, $R_{IC1}$, etc.) are superimposed on the ordinates for purposes of illustration only. The horizontal axis of FIG. 7B generally corresponds to the coupled-core multicore optical fiber along a path from a center line $CL_i$ of a core $C_i$ through inner cladding $IC_i$, and across outer common cladding 21, with center line $CL_1$ representing the r=0 value of the horizontal axis and Radius referring to radial coordinate r. The vertical axis corresponds to the relative refractive index Δ % (Delta %) as a function of the dimension of the coupled-core multicore optical fiber along the path. At center line $CL_1$, the core has a relative refractive index $\Delta_{CL1}$, relative to pure silica, and the centerline region extends to radius $r_{CL1}$. The core $C_1$ surrounds the centerline region and has a radius $r_{C1}$ with average relative refractive index $\Delta_{C1}$, relative to pure silica. Between the edge ($r_{C1}$) of the core $C_1$ and the edge of the inner cladding $IC_i$ of the coupled-core multicore optical fiber 110, designated as $R_{IC1}$, the inner cladding $IC_i$ has an average relative refractive index $\Delta_{IC1}$, relative to pure silica. In the embodiment shown in FIG. 7B, the inner cladding $IC_i$ is surrounded by outer common cladding OCC, which has an average relative refractive index $\Delta_{OCC}$, relative to pure silica. In embodiments, $\Delta_{CL1} > \Delta_{C1} > \Delta_{IC1}$. In embodiments, $\Delta_{CL1} > \Delta_{C1} > \Delta_{OCC} > \Delta_{IC1}$. In embodiments, without the optional higher index inner core segment, $\Delta_{C1} > \Delta_{IC1}$. In some of these embodiments, $\Delta_{C1} > \Delta_{OCC} > \Delta_{IC1}$. The dopants may be used, as described in the preceding paragraphs, to achieve the desired differences in $\Delta_{CL1}$, $\Delta_{C1}$, and $\Delta_{IC1}$.

In embodiments, $\Delta_{CL1}$ is greater than or equal to −0.1 Δ % and less than or equal to 0.3 Δ %. For example, $\Delta_{CL1}$ may be greater than or equal to −0.05 Δ % and less than or equal to 0.25 Δ % or greater than or equal to −0.03 Δ % and less than or equal to 0.2 Δ % or even greater than or equal to −0.03 Δ % and less than or equal to 0.15 Δ %. It should be understood $\Delta_{CL1}$ may be within a range formed from any one of the lower bounds for $\Delta_{CL1}$ and any one of the upper bounds of $\Delta_{CL1}$ described herein.

In embodiments, $\Delta_{C1}$ is greater than or equal to −0.1 Δ % and less than or equal to 0.2 Δ %. For example, $\Delta_{C1}$ may be greater than or equal to −0.05 Δ % and less than or equal to 0.15 Δ % or even greater than or equal to 0 Δ % and less than or equal to 0.1 Δ %. It should be understood $\Delta_{C1}$ may be within a range formed from any one of the lower bounds for $\Delta_{C1}$ and any one of the upper bounds of $\Delta_{C1}$ described herein.

In embodiments with an inner common cladding as depicted in FIG. 5A, $\Delta_{ICC}$ is greater than or equal to −0.4 Δ % and less than or equal to −0.2 Δ %. For example, $\Delta_{ICC}$ may be greater than or equal to −0.35 Δ % and less than or equal to −0.25 Δ %. It should be understood $\Delta_{ICC}$ may be within a range formed from any one of the lower bounds for $\Delta_{ICC}$ and any one of the upper bounds of $\Delta_{ICC}$ described herein.

In embodiments in which each of the plurality of the cores is surrounded by an individual inner cladding as depicted in FIG. 5B, $\Delta_{IC1}$ is greater than or equal to −0.4 Δ % and less than or equal to −0.2 Δ %. For example, $\Delta_{IC1}$ may be greater than or equal to −0.35 Δ % and less than or equal to −0.25 Δ %. It should be understood $\Delta_{IC1}$ may be within a range formed from any one of the lower bounds for $\Delta_{IC1}$ and any one of the upper bounds of $\Delta_{IC1}$ described herein.

In embodiments, $\Delta_{OCC}$ is greater than or equal to −0.4 Δ % and less than or equal to −0.2 Δ %. For example, $\Delta_{OCC}$ may be greater than or equal to −0.35 Δ % and less than or equal to −0.25 Δ %. It should be understood $\Delta_{OCC}$ may be within a range formed from any one of the lower bounds for $\Delta_{OCC}$ and any one of the upper bounds of $\Delta_{OCC}$ described herein.

While not intending to be limited by theory, the electromagnetic fields of the waves (e.g., light waves) propagating in the coupled-core multicore optical fiber 110 may be coupled, for example, selectively coupled, when certain conditions are met. For example, each of the plurality of cores $C_i$ of the coupled-core multicore optical fiber 110 may be characterized by a plurality of coupling coefficients (i.e., various coupling coefficients for coupling from one individual core, such as the first core $C_1$, to another individual core, such as the second core $C_2$). Coupling coefficients measure the amount of overlay between the modal fields of two cores of the plurality of cores $C_1$, such as the first core $C_1$ and the second core $C_2$. Modal fields of the cores depend on various parameters, such as the radius of the core $r_{Ci}$, the refractive index of the core, the material of the core, the material of the cladding, and the wavelength of operation (λ) (i.e., the wavelength of light propagating in the core).

The coupling coefficient κ between two adjacent cores $C_1$, $C_2$ depend upon the core pitch between adjacent cores, which may also be referred to as the core spacing. Larger coupling coefficients are expected as the distance between cores decreases. For instance, at very small core spacing, e.g. 15 µm, the coupling coefficient may be greater than or equal to 100 (linear units) per meter and less than or equal to 600 per meter, or greater than or equal to 150 per meter and less than or equal to 550 per meter, or even greater than or equal to 300 per meter and less than or equal to 400 per meter. However, at very large core spacing, e.g. 60 µm, the coupling coefficient may be greater than or equal to $8 \times 10^{-6}$ per meter and less than or equal to $4 \times 10^{-4}$ per meter.

In embodiments, the coupling coefficient may be greater than or equal to $1 \times 10^{-3}$/m. For instance, the power coupling coefficient may be greater than or equal to $1 \times 10^{-3}$/m and less than or equal to $5 \times 10^{-3}$/m or greater than or equal to $1.5 \times 10^{-3}$/m and less than or equal to $4.5 \times 10^{-3}$/m or greater than or equal to $2 \times 10^{-3}$/m and less than or equal to $4 \times 10^{-3}$/m or even greater than or equal to $2.5 \times 10^{-3}$/m and less than or equal to $3.5 \times 10^{-3}$/m.

Another parameter affecting the transmission of information using the fibers described herein is crosstalk. In various embodiments, the crosstalk between two adjacent cores 120a, 120b is greater than or equal to −30 dB for 1 km fiber length and less than or equal to 0 dB for 1 km fiber length. For example, the crosstalk may be greater than or equal to −25 dB for 1 km fiber length and less than or equal to −1 dB for 1 km fiber length, greater than or equal to −20 dB for 1 km fiber length and less than or equal to −2 dB for 1 km fiber length, greater than or equal to −15 dB for 1 km fiber length and less than or equal to −3 dB for 1 km fiber length, or even greater than or equal to −10 dB for 1 km fiber length and less than or equal to −4 dB for 1 km fiber length. It should be understood crosstalk may be within a range formed from any one of the lower bounds for crosstalk and any one of the upper bounds of crosstalk described herein.

In embodiments, each core of the coupled-core multicore optical fiber 110 may have an effective area $A_{eff}$ of greater than 100 µm² at a wavelength of 1550 nm. The effective area is determined individually for each core of the coupled-core multicore optical fiber without consideration of the effects of crosstalk between the cores of the coupled-core multicore optical fiber. For instance, the effective area or each core may be greater than or equal to 110 µm² and less than or equal to 160 µm², greater than or equal to 120 µm² and less than or equal to 158 µm², greater than or equal to 124 µm² and less than or equal to 156 µm², greater than or equal to 126 µm² and less than or equal to 154 µm², greater than or equal to 128 µm² and less than or equal to 152 µm², greater than or equal to 130 µm² and less than or equal to 150 µm², greater than or equal to 132 µm² and less than or equal to 148 µm², greater than or equal to 134 µm² and less than or equal to 146 µm², greater than or equal to 136 µm² and less than or equal to 144 µm², or even greater than or equal to 138 µm² and less than or equal to 142 µm². In other embodiments, each core of the coupled-core multicore optical fiber 110 may have an effective area of greater than or equal to 70 µm² and less than or equal to 85 µm² at a wavelength of 1550 nm. For instance, the effective area of each core may be greater than or equal to 71 µm² and less than or equal to 84 µm², greater than or equal to 72 µm² and less than or equal to 83 µm², greater than or equal to 73 µm² and less than or equal to 82 µm², greater than or equal to 74 µm² and less than or equal to 81 µm², greater than or equal to 75 µm² and less than or equal to 80 µm², greater than or equal to 76 µm² and less than or equal to 79 µm², or even greater than or equal to 77 µm² and less than or equal to 78 µm². It should be understood that the $A_{eff}$ of each core of the coupled-core multicore optical fiber 110 may be within a range formed from any one of the lower bounds for $A_{eff}$ and any one of the upper bounds of $A_{eff}$ described herein.

The average attenuation of the coupled-core multicore optical fiber is determined by measuring the attenuation for each core of the coupled-core multicore optical fiber at a wavelength of 1510 nm and then calculating an average attenuation for the entire coupled-core multicore optical fiber based on the individual attenuation measurements of each core. In embodiments, the average attenuation of the coupled-core multicore optical fiber 110 is less than or equal to 0.18 dB/km, less than or equal to 0.175 dB/km, less than or equal to 0.17 dB/km, or even less than or equal to 0.165 dB/km. In embodiments, the attenuation of the optical fiber at a wavelength of 1550 nm may be greater than or equal to 0.16 dB/km and less than or equal to 0.18 dB/km, greater than or equal to 0.165 dB/km and less than or equal to 0.175 dB/km, greater than or equal to 0.16 dB/km and less than or equal to 0.175 dB/km, or even greater than or equal to 0.165 dB/km and less than or equal to 0.18 dB/km. It should be understood that the attenuation of the coupled-core multicore optical fiber 110 may be within a range formed from any one of the lower bounds for attenuation and any one of the upper bounds of attenuation described herein.

In various embodiments, the cable cutoff of each core of the coupled-core multicore optical fiber 110 is greater than or equal to 1200 nm and less than or equal to 1530 nm. For example, the cable cutoff of each core of each core of the coupled-core multicore optical fiber 110 may be greater than or equal to 1220 nm and less than or equal to 1530 nm, greater than or equal to 1240 nm and less than or equal to 1530 nm, greater than or equal to 1260 nm and less than or equal to 1530 nm, greater than or equal to 1280 nm and less than or equal to 1530 nm, greater than or equal to 1300 nm and less than or equal to 1500 nm, greater than or equal to 1320 nm and less than or equal to 1480 nm, greater than or equal to 1340 nm and less than or equal to 1460 nm, greater than or equal to 1360 nm and less than or equal to 1440 nm, greater than or equal to 1380 nm and less than or equal to 1420 nm, greater than or equal to 1390 nm and less than or equal to 1400 nm, greater than or equal to 1300 and less than or equal to 1500 nm, or even greater than or equal to 1320 and less than or equal to 1480 nm. It should be understood that the cable cutoff of each core of the coupled-core multicore optical fiber 110 may be within a range formed from any one of the lower bounds for cable cutoff and any one of the upper bounds of cable cutoff described herein.

The average 15 mm bend loss of the coupled-core multicore optical fiber is determined by measuring the 15 mm bend loss for each core of the coupled-core multicore optical fiber at a wavelength of 1510 nm and then calculating an average 15 mm bend loss for the entire coupled-core multicore optical fiber based on the individual 15 mm bend loss measurements of each core. In various embodiments, the average bend loss of the coupled-core multicore optical fiber 110 measured at a wavelength of 1550 nm using a mandrel with a 15 mm diameter ("1×15 mm diameter bend loss") is greater than or equal to 0.1 dB/turn and less than or equal to 10 dB/turn. For example, the 1×15 mm diameter bend loss at 15 mm is less than or equal to 5 dB/turn, less than or equal to 4 dB/turn, less than or equal to 3 dB/turn, less than or equal to 2 dB/turn, or even less than or equal to 1 dB/turn.

The average 20 mm bend loss of the coupled-core multicore optical fiber is determined by measuring the 20 mm bend loss for each core of the coupled-core multicore optical fiber at a wavelength of 1510 nm and then calculating an average 20 mm bend loss for the entire coupled-core multicore optical fiber based on the individual 20 mm bend loss measurements of each core. In various embodiments, the average bend loss of the coupled-core multicore optical fiber 110 at a wavelength of 1550 nm using a mandrel with a 20 mm diameter ("1×20 bend loss") is greater than or equal to 0.01 dB/turn and less than or equal to 1 dB/turn. For example, the 1×20 bend loss is less than or equal to 0.8 dB/turn, less than or equal to 0.6 dB/turn, less than or equal to 0.5 dB/turn, less than or equal to 0.4 dB/turn, less than or equal to 0.3 dB/turn, or even less than or equal to 0.2 dB/turn.

The average 30 mm bend loss of the coupled-core multicore optical fiber is determined by measuring the 30 mm bend loss for each core of the coupled-core multicore optical fiber at a wavelength of 1510 nm and then calculating an average 30 mm bend loss for the entire coupled-core multicore optical fiber based on the individual 30 mm bend loss measurements of each core. In various embodiments, the average bend loss at 1550 nm of the coupled-core multicore optical fiber 110 at a wavelength of 1550 nm using a mandrel with a 30 mm diameter ("1×30 bend loss") is greater than or equal to 0.001 dB/turn and less than or equal to 0.03 dB/turn. For example, the 1×30 bend loss is greater than or equal to 0.001 dB/turn and less than or equal to 0.025 dB/turn or even greater than or equal to 0.001 dB/turn and less than or equal to 0.02 dB/turn. It should be understood that the 1×30 bend loss mm of the coupled-core multicore optical fiber 110 may be within a range formed from any one of the lower bounds for 1×30 bend loss and any one of the upper bounds of 1×30 bend loss described herein.

In various embodiments, the zero-dispersion wavelength of each core of the coupled-core multicore optical fiber 110 is greater than or equal to 1200 nm and less than or equal to 1350 nm. For example, the zero-dispersion wavelength of each core of the coupled-core multicore optical fiber 110 may be greater than or equal to 1225 nm and less than or equal to 1325 nm or even greater than or equal to 1250 nm and less than or equal to 1300 nm. It should be understood that the zero-dispersion wavelength of each core of the coupled-core multicore optical fiber 110 may be within a range formed from any one of the lower bounds for zero-dispersion wavelength and any one of the upper bounds of zero-dispersion wavelength described herein.

In various embodiments, dispersion at 1310 nm of each core of the coupled-core multicore optical fiber 110 is greater than or equal to 0.2 ps/nm/km and less than or equal to 3.5 ps/nm/km. For example, the dispersion at 1310 of each core of the coupled-core multicore optical fiber 110 may be greater than or equal to 0.5 ps/nm/km and less than or equal to 3 ps/nm/km, greater than or equal to 1 ps/nm/km and less than or equal to 2.5 ps/nm/km, or even greater than or equal to 1.5 ps/nm/km and less than or equal to 2 ps/nm/km. It should be understood that the dispersion at 1310 nm of each core of the coupled-core multicore optical fiber 110 may be within a range formed from any one of the lower bounds for dispersion at 1310 nm and any one of the upper bounds of dispersion at 1310 nm described herein.

In various embodiments, the dispersion slope at 1310 nm of each core of the coupled-core multicore optical fiber 110 is greater than or equal to 0.08 ps/nm$^2$/km and less than or equal to 0.095 ps/nm$^2$/km. For example, the dispersion slope at 1310 nm of each core of the coupled-core multicore optical fiber 110 may be greater than or equal to 0.081 ps/nm$^2$/km and less than or equal to 0.094 ps/nm$^2$/km, greater than or equal to 0.082 ps/nm$^2$/km and less than or equal to 0.093 ps/nm$^2$/km, greater than or equal to 0.083 ps/nm$^2$/km and less than or equal to 0.092 ps/nm$^2$/km, greater than or equal to 0.084 ps/nm$^2$/km and less than or equal to 0.091 ps/nm$^2$/km, greater than or equal to 0.085 ps/nm$^2$/km and less than or equal to 0.09 ps/nm$^2$/km, greater than or equal to 0.086 ps/nm$^2$/km and less than or equal to 0.089 ps/nm$^2$/km, or even greater than or equal to 0.087 ps/nm$^2$/km and less than or equal to 0.088 ps/nm$^2$/km. It should be understood that the dispersion slope at 1310 nm of each core of the coupled-core multicore optical fiber 110 may be within a range formed from any one of the lower bounds for dispersion slope at 1310 nm and any one of the upper bounds of dispersion slope at 1310 nm described herein.

In various embodiments, dispersion at 1550 nm of each core of the coupled-core multicore optical fiber 110 is greater than or equal to 15 ps/nm/km and less than or equal to 25 ps/nm/km. For example, dispersion at 1550 of each core of the coupled-core multicore optical fiber 110 may be greater than or equal to 16 ps/nm/km and less than or equal to 24 ps/nm/km, greater than or equal to 17 ps/nm/km and less than or equal to 23 ps/nm/km, greater than or equal to 18 ps/nm/km and less than or equal to 22 ps/nm/km, or even greater than or equal to 19 ps/nm/km and less than or equal to 21 ps/nm/km. It should be understood that the dispersion at 1550 nm of each core of the coupled-core multicore optical fiber 110 may be within a range formed from any one of the lower bounds for dispersion at 1550 nm and any one of the upper bounds of dispersion at 1550 nm described herein.

In various embodiments, the dispersion slope at 1550 nm of each core of the coupled-core multicore optical fiber 110 is greater than or equal to 0.05 ps/nm$^2$/km and less than or equal to 0.065 ps/nm$^2$/km. For example, the dispersion slope at 1550 nm of each core of the coupled-core multicore optical fiber 110 may be greater than or equal to 0.051 ps/nm$^2$/km and less than or equal to 0.064 ps/nm$^2$/km, greater than or equal to 0.052 ps/nm$^2$/km and less than or equal to 0.063 ps/nm$^2$/km, greater than or equal to 0.053 ps/nm$^2$/km and less than or equal to 0.062 ps/nm$^2$/km, greater than or equal to 0.054 ps/nm$^2$/km and less than or equal to 0.061 ps/nm$^2$/km, greater than or equal to 0.055 ps/nm$^2$/km and less than or equal to 0.06 ps/nm$^2$/km, greater than or equal to 0.056 ps/nm$^2$/km and less than or equal to 0.059 ps/nm$^2$/km, or even greater than or equal to 0.057 ps/nm$^2$/km and less than or equal to 0.058 ps/nm$^2$/km. It should be understood that the dispersion slope at 1550 nm of each core of the coupled-core multicore optical fiber 110 may be within a range formed from any one of the lower bounds for dispersion slope at 1550 nm and any one of the upper bounds of dispersion slope at 1550 nm described herein.

The coupled-core multicore optical fiber 110 of the present disclosure can be made using any suitable method for forming a multicore optical fiber. See, for example, U.S. Pat. No. 9,120,693 and U.S. Published Patent Application No. 20150284286, the disclosures of which are incorporated herein by reference in their entirety. For example, the coupled-core multicore optical fiber 110 can be formed by drawing a multicore preform made using conventional optical-fiber techniques, such as glass drilling or stacking. The glass drilling method can be used to form a multicore preform by drilling holes in a silica glass cylinder (pure, undoped silica or doped silica). The locations and dimensions of the holes are based on the multicore optical fiber design. Core canes having the desired refractive index profile and a diameter that is slightly smaller than the pre-drilled holes are then inserted into the pre-drilled holes to form the multicore preform. The multicore preform is then heated to a temperature sufficient to melt the silica glass forming the pre-drilled holes such that the pre-drilled holes collapse around the core canes. The multicore preform is then drawn into a fiber. The core canes can be made using any suitable conventional preform manufacturing technique, such as outside vapor deposition (OVD), modified chemical vapor deposition (MCVD), or plasma activated chemical vapor deposition (PCVD).

Suitable precursors for silica include SiCl and organosilicon compounds. Organosilicon compounds are silicon compounds that include carbon, and optionally oxygen and/or hydrogen. Examples of suitable organosilicon compounds include octamethylcyclotetra-siloxane (OMCTS), silicon alkoxides ($Si(OR)_4$), organosilanes ($SiR_4$), and $Si(OR)_xR_{4-x}$, where R is a carbon-containing organic group or hydrogen and where R may be the same or different at each occurrence, and wherein at least one R is a carbon-containing organic group. Suitable precursors for chlorine doping include $Cl_2$, $SiCl_4$, $Si_2Cl_6$, $Si_2OCl_6$, $SiCl_3H$, and $CCl_4$. Suitable precursors for fluorine doping include $F_2$, $CF_4$, and $SiF_4$. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions. The OVD, MCVD, PCVD and other techniques for generating silica soot permit fine control of dopant concentration through layer-by-layer deposition with variable flow rate delivery of dopant precursors.

One exemplary method that can be used to form the multicore optical fibers of the present disclosure is a method that utilizes a cane-based optical fiber preform and then draws the optical fiber from the cane-based glass preform. An exemplary cane-based glass preform method is disclosed in Applicant's co-pending U.S. Patent Application Ser. No. 62/811,842, entitled "Vacuum-Based Methods of Forming a Cane-Based Optical Fiber Preform and Methods of Forming an Optical Fiber Using Same," which was filed on Feb. 28, 2019, the contents of which are incorporated herein by reference in their entirety.

Briefly, a cane-based glass preform method for forming the multicore optical fibers 10 can include utilizing one or more glass cladding sections each having one or more precision axial holes formed therein and a top end with a recess defined by a perimeter lip. When using multiple glass cladding sections, the sections can be stacked so that the axial holes are aligned. A core cane can then be added to each axial hole to define a cane-cladding assembly. Top and bottom caps, respectively, can be added to the top and bottom of the cane-cladding assembly to define a preform assembly. The top cap closes off the recess at the top of the glass-cladding section. The bottom cap can have its own raised lip and recess that becomes closed off when the bottom cap is interfaced with the bottom end of the cane-cladding assembly. The closed-off recesses and gaps formed by the canes within the axial holes define a substantially sealed internal chamber. The preform assembly can then be dried and purified by drawing a select cleaning gas (e.g., chlorine) through a small passage in the bottom cap that leads to the internal chamber. A vacuum can be applied through the top cap to create a pressure differential between the internal chamber and the ambient environment. The pressure differential facilitates maintaining the components of the preform assembly together, and can be referred to as a vacuum-held preform assembly. The vacuum-held preform assembly can then be consolidated by heating in a furnace to just above the glass softening temperature so that the glass cladding section(s), the core canes, and the top and bottom caps, which are all made of glass, seal to one another. In addition, the glass flow can remove the internal chamber. The result is a solid glass preform that is ready to be drawn, especially if the furnace used for the consolidation is a draw furnace used for drawing optical fiber.

Additionally, if an outer common cladding is to be included, the material that will become the outer common cladding may be added to the outer surface of the preform containing the cores. For instance, soot may be applied to the preform via organic vapor deposition and then consolidated with the desired dopant. After the cores, inner common cladding material, and outer common cladding material are assembled as above, the coupled-core multicore optical fibers may then be drawn to the desired fiber diameter, as described above.

The coupled-core multicore optical fibers described herein will now be further described with reference to the following examples.

EXAMPLES

Fabrication of Coupled-Core Multicore Optical Fibers

The coupled-core multicore optical fiber shown in FIG. 2 was fabricated as follows. A core cane was drawn to an outer diameter of 5 mm and a length of 120 mm. In general, the core cane was composed of potassium-doped silica in which the potassium concentration was from 150 ppm to 250 ppm. The core cane was cut into four sections having a length of 30 cm. Separately, an inner common cladding preform with a target outer diameter of 28 mm was fabricated and doped with 1.11 wt. % fluorine during consolidation such that the refractive index delta (i.e., $\Delta_{ICC}$ %) was −0.34% relative to pure silica. Four 5 mm holes were drilled into the fluorine-doped preform. The centers of the holes were symmetrically located 5.9 mm away from the central axis of the preform. The core cane sections were inserted into the holes drilled into the inner common cladding preform, and a 35 mm lead and tail section of a dummy preform were added to create a 1 m preform with an outer diameter of 28 mm. Soot was applied to the inner common cladding preform via outside vapor deposition, and doped with 0.95 wt. % fluorine during consolidation to create a fluorine-doped outer common cladding with an outer diameter of 53 mm and a relative refractive index delta of −0.29% relative to pure silica around the inner cladding preform. Optical fiber was then drawn from the preform with a cladding diameter of 125 μm. The diameters of the cores and common inner cladding in the drawn fiber had the same 125 μm/53 mm scaling ratio and are 11.8 μm and 66 μm, respectively.

Characterization of Exemplary Coupled-Core Multicore Optical Fibers

Figure 9:
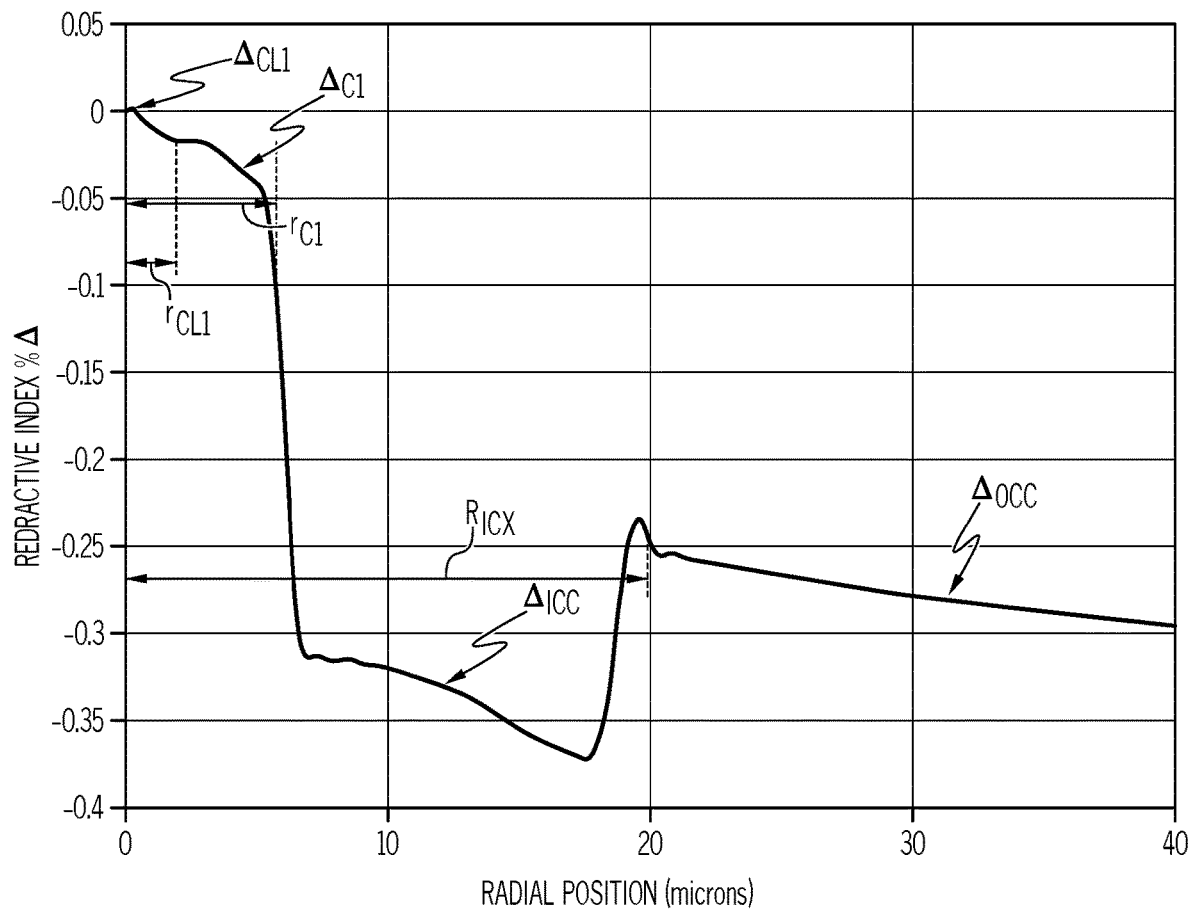
FIG. 9 graphically depicts a relative refractive index profile of a single core, inner common cladding, and outer common cladding of the coupled-core multicore fiber of Example 2, according to one or more embodiments shown and described herein.
Figure 10:
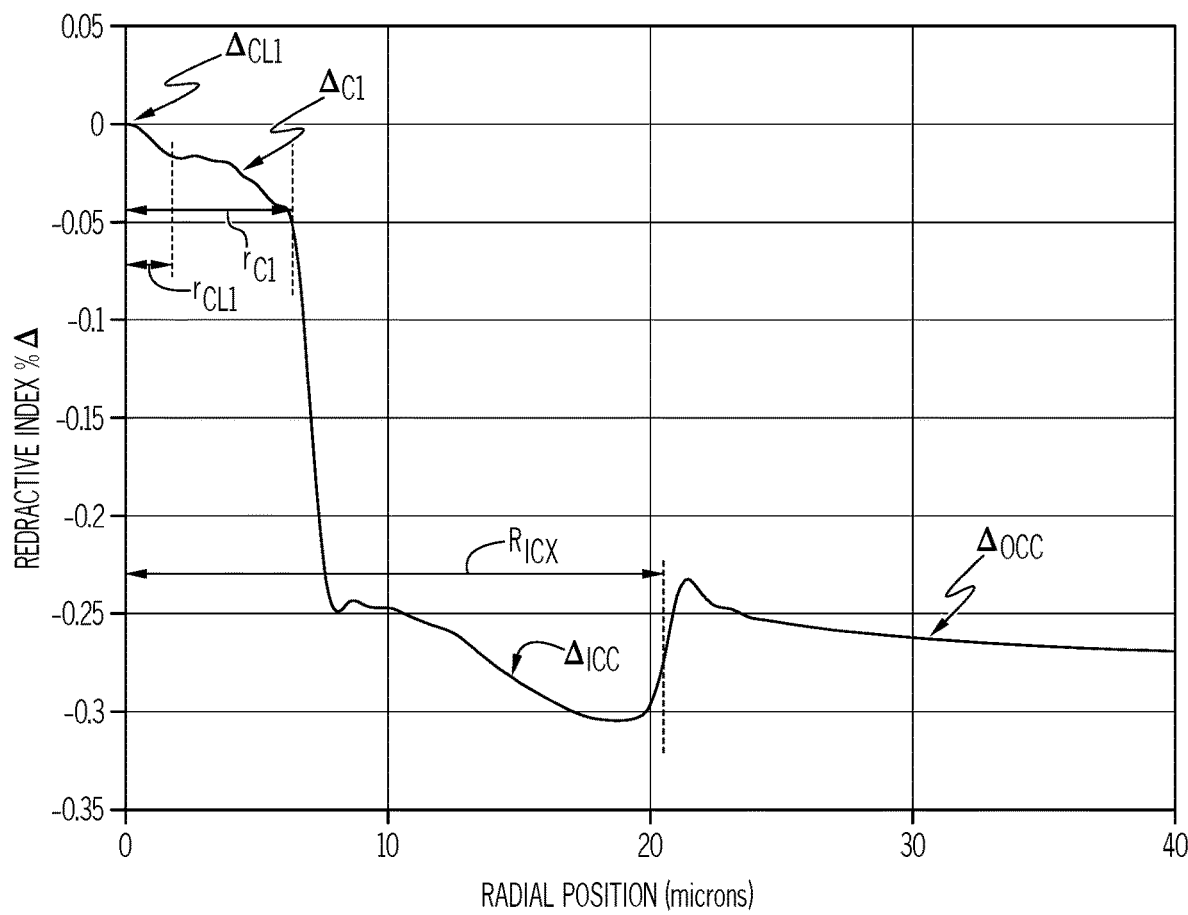
FIG. 10 graphically depicts a relative refractive index profile of a single core, inner common cladding, and outer common cladding of the coupled-core multicore fiber of Example 3, according to one or more embodiments shown and described herein.
Figure 11:
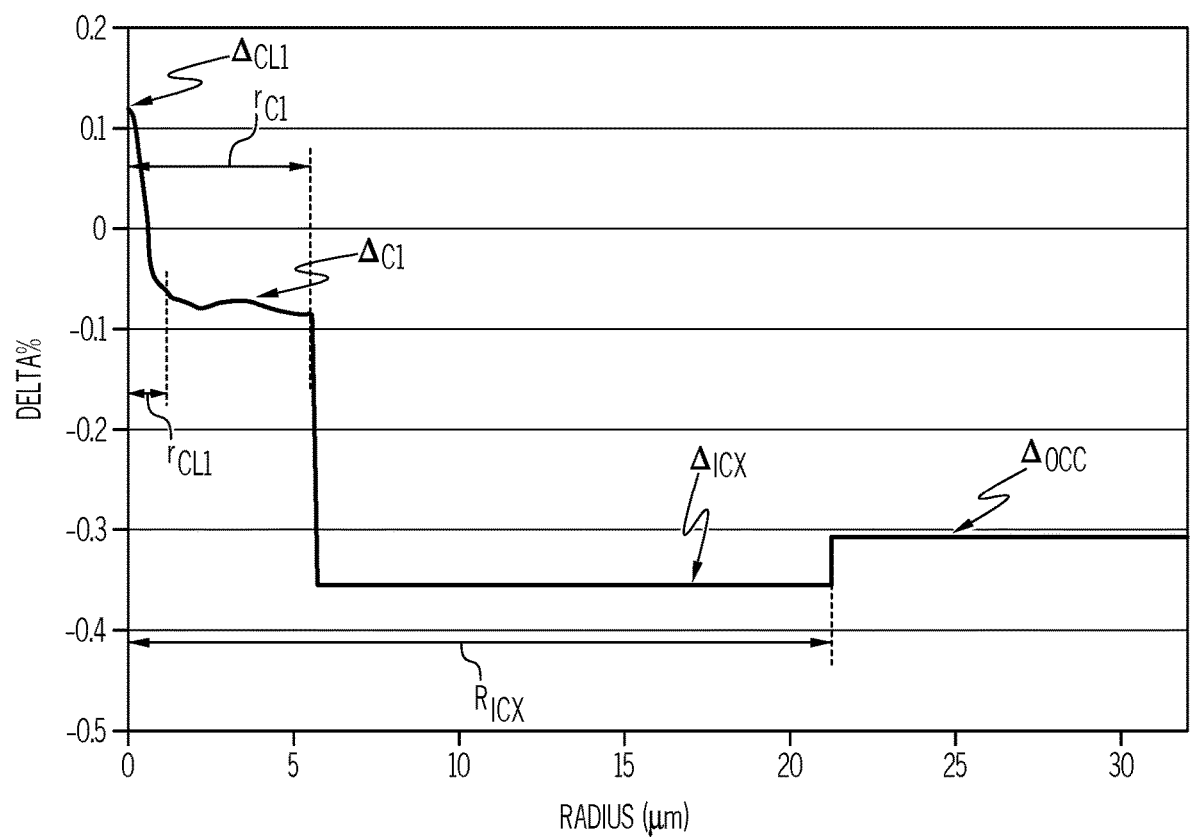
FIG. 11 graphically depicts a relative refractive index profile of a single core, inner common cladding, and outer common cladding of the coupled-core multicore fiber of Example 4, according to one or more embodiments shown and described herein.
Figure 12:
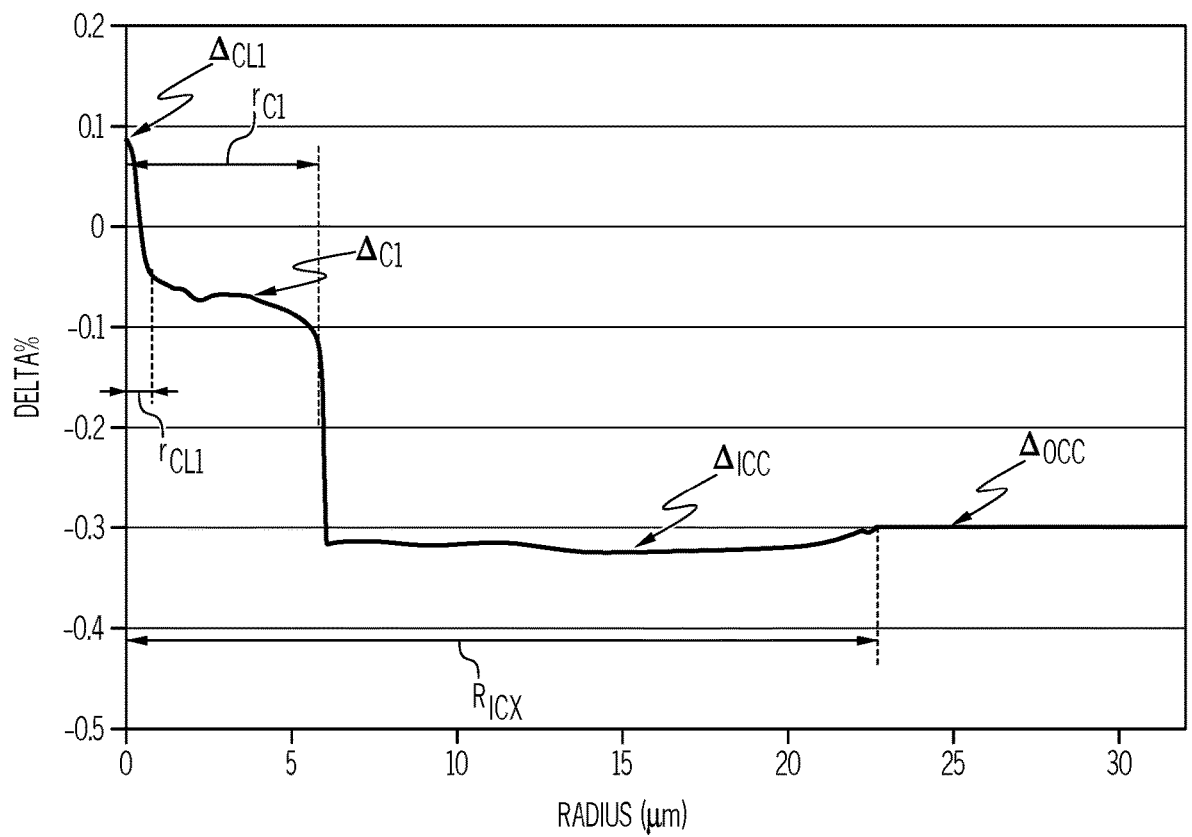
FIG. 12 graphically depicts a relative refractive index profile of a single core, inner common cladding, and outer common cladding of the coupled-core multicore fiber of Example 5, according to one or more embodiments shown and described herein.
Figure 13:
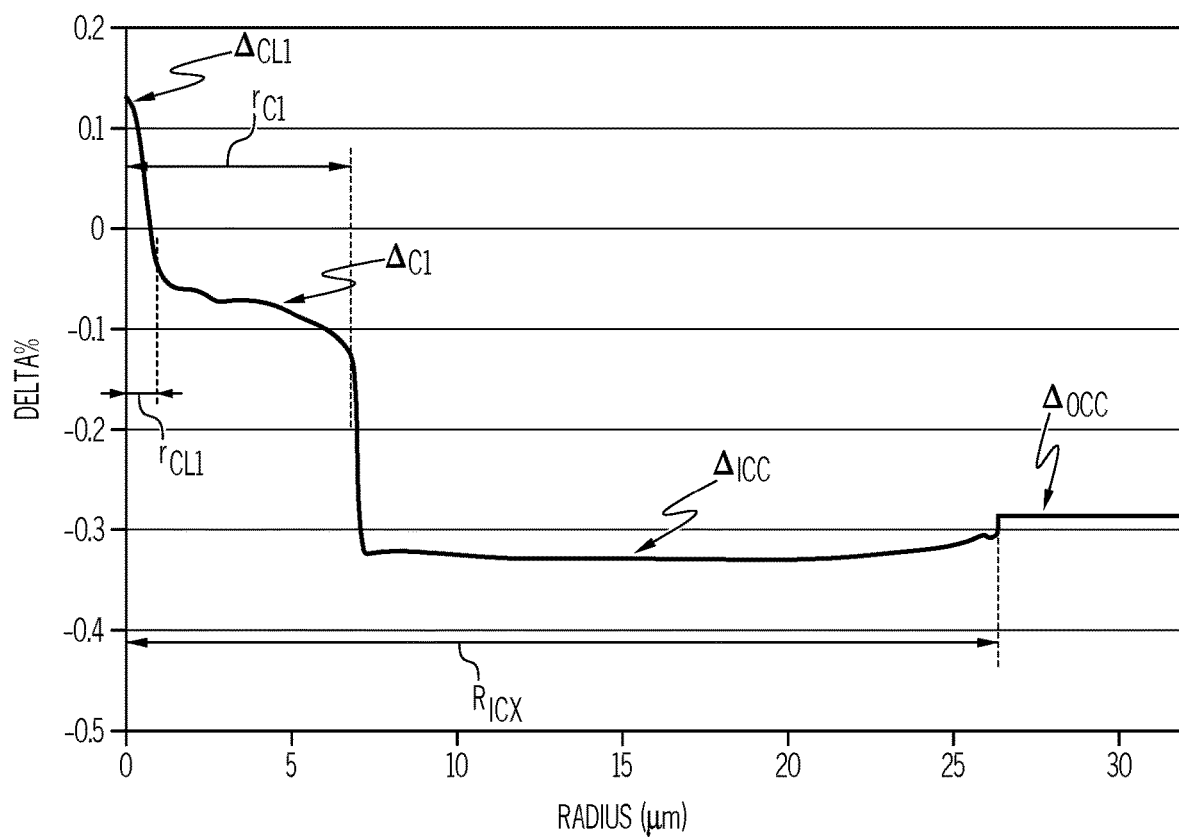
FIG. 13 graphically depicts a relative refractive index profile of a single core, inner common cladding, and outer common cladding of the coupled-core multicore fiber of Example 6, according to one or more embodiments shown and described herein.

Six coupled-core multicore optical fibers were fabricated as detailed above in a 2×2 core ("four core") arrangement as depicted in FIG. 5A. The four cores were symmetrically disposed about the central fiber axis 12. These example coupled-core multicore optical fibers were characterized by obtaining their refractive index profiles to obtain $\Delta_{CL1}$, $\Delta_{C1}$, $\Delta_{ICC}$, and $\Delta_{OCC}$, all in %, as well as $r_{CL1}$, $r_{C1}$, and $R_{ICC}$, all in μm. The results are presented in Table 1. The geometric parameters, including overall fiber diameter in μm, and the core-to-core distance ("core pitch") in μm were also determined. Physical characteristics, including the effective area ($A_{eff}$) of the cores in μm$^2$, the average attenuation in dB/km, the cable cutoff in nm of each core, average 1×15 mm diameter bend loss at 1550 nm in dB/turn, average 1×20 mm diameter bend loss at 1550 nm in dB/turn, average 1×30 mm diameter bend loss at 1550 nm in dB/turn, zero-dispersion wavelength in nm of each core, the dispersion at 1310 nm in ps/nm/km of each core, dispersion slope at 1310 nm in ps/nm$^2$/km of each core, the dispersion at 1550 nm in ps/nm/km of each core, and the dispersion slope at 1550 nm in ps/nm$^2$/km of each core, were also determined. Additionally, the concentration of fluorine in the respective claddings in wt. % was determined. The characterization data are tabulated in Table 1. The refractive index profile of Example 1 prior to being drawn and scaled to the dimensions anticipated in the optical fiber is shown in FIG. 8. The refractive index profile of Example 2 after being drawn is shown in FIG. 9. The refractive index profile of Example 3 after being drawn is shown in FIG. 10. The refractive index profile of Example 4 prior to being drawn and scaled to the dimensions anticipated in the optical fiber is shown in FIG. 11. The refractive index profile of Example 5 prior to being drawn is shown in FIG. 12. The refractive index profile of Example 6 prior to being drawn and scaled to the dimensions anticipated in the optical fiber is shown in FIG. 13. The radii and percent delta values of the index profiles shown in FIG. 8-13 are labeled similarly to those of FIG. 7A.

TABLE 1

| | Example | | | | | |
|---|---|---|---|---|---|---|
| | 1 | 2 | 3 | 4 | 5 | 6 |
| $\Delta_{CL1}$ (%) | 0.114 | 0 | 0 | 0.114 | 0.085 | 0.134 |
| $r_{CL1}$ (μm) | 1.15 | 2.22 | 2.22 | 1.409 | 2.13 | 2.69 |
| $\Delta_{C1}$ (%) | −0.068 | −0.039 | −0.039 | −0.071 | −0.071 | −0.073 |
| $r_{C1}$ (μm) | 4.41 | 6.845 | 8.14 | 5.752 | 6.12 | 7.27 |
| $\Delta_{ICC}$ (%) | | | | | | |
| $R_{ICCX}$ (μm) | 15.5 | 17.57 | 19.43 | 21.26 | 22.64 | 26.57 |
| $\Delta_{OCC}$ (%) | −0.44 | −0.273 | −0.253 | −0.308 | −0.305 | −0.287 |
| F wt % core and inner cladding portions | 1.47 | 1.04 | 0.83 | 1.18 | −1.06 | 1.08 |
| Max F wt % inner common cladding portion | 1.63 | 1.24 | 1.01 | 1.18 | 1.06 | 1.08 |
| F wt % in outer common cladding | 1.47 | 0.91 | 0.84 | 1.03 | 1.02 | 0.96 |
| Fiber Diameter $R_{OCC}$ (μm) | 125 | 125 | 125 | 125 | 125 | 125 |
| Core-to-core minimum distance (core pitch) (μm) | 31 | 35.14 | 38.84 | 42.51 | 45.28 | 53.14 |
| Core-to-core maximum distance (core pitch between diagonally adjacent cores) (μm) | 63.63 | 63.63 | 63.63 | 63.63 | 63.63 | 63.63 |
| $A_{eff}$ at 1550 nm (μm$^2$) of each core | 73.54 | 115 | 150 | 111 | 122.8 | 136 |
| Average Attenuation at 1550 nm (dB/km) | 0.165 | 0.165 | 0.165 | 0.165 | 0.165 | 0.165 |
| Cable cutoff (nm) of each core | 1219 | 1393 | 1528 | 1353 | 1364 | 1528 |
| Average 1 × 15 mm diameter bend loss (dB/turn) | 0.529 | 1.23 | 1.38 | 1.9 | 3.84 | 0.859 |
| Average 1 × 20 mm diameter bend loss (dB/turn) | 0.103 | 0.306 | 0.308 | 0.46 | 0.923 | 0.202 |
| Average 1 × 30 mm diameter bend loss (dB/turn) | 0.0017 | 0.018 | 0.008 | 0.02 | 0.029 | 0.01 |
| Zero-dispersion wavelength (nm) of each core | 1313 | 1285 | 1284 | 1290 | 1291 | 1285 |
| Dispersion at 1310 nm (ps/nm/km) of each core | 0.388 | 3 | 3.07 | 2.5 | 2.4 | 3 |
| Dispersion slope at 1310 nm (ps/nm$^2$/km) of each core | 0.0867 | 0.09 | 0.091 | 0.088 | 0.0889 | 0.092 |
| Dispersion at 1550 nm (ps/nm/km) of each core | 17.17 | 20.66 | 21.03 | 19.97 | 19.96 | 20.94 |
| Dispersion slope at 1550 nm (ps/nm$^2$/km) of each core | 0.058 | 0.06 | 0.062 | 0.06 | 0.061 | 0.063 |

Examples 1, 3, 5, 6 were also examined to determine the coupling coefficient and the crosstalk between adjacent cores in dB with various core-to-core spacing. The coupling coefficients were determined by calculating the overlap integral between the electric fields of the LP01 modes in two neighboring cores. The crosstalk was calculated based on Equation (7). The results are summarized in Table 2 (coupling coefficients) and Table 3 (crosstalk). From the two tables, it is possible to choose the core spacing for a profile design to achieve a desired coupling coefficient and crosstalk. For coupled core multicore optical fibers, the core spacing can provide a coupling coefficient greater than or equal to $3.4 \times 10^{-4}$/m, greater than or equal to $1.1 \times 10^{-3}$/m, or even greater than or equal to $2.5 \times 10^{-3}$/m. The crosstalk is greater than or equal to −20 dB, greater than or equal to −10 dB, or even equal to 0 dB.

TABLE 2

| Core spacing (μm) | Coupling coefficients (per meter) | | | |
|---|---|---|---|---|
| | Example 1 | Example 3 | Example 5 | Example 6 |
| 15 | 158.7685 | 509.718 | 333.266 | 380.7536 |
| 20 | 24.62562 | 101.1711 | 71.81051 | 77.00593 |
| 25 | 3.819529 | 20.08087 | 15.47338 | 15.57415 |
| 30 | 0.592424 | 3.985739 | 3.334127 | 3.149811 |
| 35 | 0.091887 | 0.791107 | 0.718421 | 0.637037 |
| 40 | 0.014252 | 0.157022 | 0.154802 | 0.128838 |
| 45 | 0.002211 | 0.031166 | 0.033356 | 0.026057 |
| 50 | 0.000343 | 0.006186 | 0.007187 | 0.00527 |
| 55 | 5.32E−05 | 0.001228 | 0.001549 | 0.001066 |
| 60 | 8.25E−06 | 0.000244 | 0.000334 | 0.000216 |

TABLE 3

| Core spacing (μm) | Crosstalk (dB) | | | |
|---|---|---|---|---|
| | Example 1 | Example 3 | Example 5 | Example 6 |
| 15 | 0 | 0 | 0 | 0 |
| 20 | 0 | 0 | 0 | 0 |
| 25 | 0 | 0 | 0 | 0 |
| 30 | 0 | 0 | 0 | 0 |
| 35 | −10.7 | 0 | 0 | 0 |
| 40 | −26.9 | −6.1 | −6.2 | −7.8 |
| 45 | −43.1 | −20.1 | −19.5 | −21.7 |
| 50 | −59.3 | −34.2 | −32.9 | −35.6 |
| 55 | −75.5 | −48.2 | −46.2 | −49.4 |
| 60 | −91.7 | −62.3 | −59.5 | −63.3 |

As shown in Examples 2-6, the optical fibers described herein are capable of achieving an effective area $A_{eff}$ for each core of greater than 100 μm² at 1550 nm. And in some instances, the $A_{eff}$ of each core may be much greater, such as with Example 3, which has an $A_{eff}$ for each core of 150 μm². However, the average attenuation remained relatively low in all the examples, i.e., 0.165 dB/km. The attenuation would be expected to be higher if there were significant levels of crosstalk present, but this undesirable phenomenon is suppressed through optimization of the refractive indices and dimensions of the cores and claddings and the spacing between the cores.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A coupled-core multicore optical fiber comprising:
an outer common cladding comprising a relative refractive index $\Delta_{OCC}$ relative to pure silica; and
a plurality of cores disposed in the outer common cladding, each of the plurality of cores comprising an inner core portion comprising a relative refractive index $\Delta_{Ci}$ relative to pure silica and a maximum relative refractive index $\Delta_{CLi}$ relative to pure silica;
wherein:
$\Delta_{CLi} > \Delta_{Ci} > \Delta_{OCC}$;
each of the inner core portions comprises silica-based glass containing greater than or equal to 0.02 wt. % and less than or equal to 0.15 wt. % fluorine;
a distance between centers of an adjacent two of the plurality of cores is greater than or equal to 20 micrometers (μm) and less than or equal to 40 μm; and
a coupling coefficient κ between adjacent cores in the plurality of cores is greater than or equal to $1 \times 10^{-3}$/m.

2. The coupled-core multicore optical fiber of claim 1, wherein a distance between centers of an adjacent two of the plurality of cores is greater than or equal to 45 μm and less than or equal to 65 μm.

3. The coupled-core multicore optical fiber of claim 1, wherein a crosstalk between the plurality of cores is greater than or equal to −50 decibels (dB) per kilometer.

4. The coupled-core multicore optical fiber of claim 1, comprising greater than or equal to 2 and less than or equal to 6 of the cores.

5. The coupled-core multicore optical fiber of claim 1, comprising 3 sets of 3 of the cores.

6. The coupled-core multicore optical fiber of claim 1, wherein a cable cutoff wavelength of each of the plurality of cores of the optical fiber is greater than or equal to 1200 nanometers (nm) and less than or equal to 1520 nm.

7. The coupled-core multicore optical fiber of claim 1, wherein an average bend loss of the plurality of cores of the optical fiber at a wavelength of 1550 nm measured on a mandrel having a diameter of 20 millimeters (mm) is greater than or equal to 0.01 decibels per turn (dB/turn) and less than or equal to 1 dB/turn.

8. The coupled-core multicore optical fiber of claim 1, wherein an average bend loss of the plurality of cores of the optical fiber at a wavelength of 1550 nm measured on a mandrel having a diameter of 30 mm is greater than or equal to 0.001 decibels per turn (dB/turn) and less than or equal to 0.03 dB/turn.

9. The coupled-core multicore optical fiber of claim 1, wherein a minimum distance between a center of one of the plurality of cores to an adjacent edge of the optical fiber along a line formed by a centerpoint of the optical fiber, the center of the one of the plurality of cores, and the adjacent edge in a plane perpendicular to a long axis of the coupled-core multicore optical fiber is greater than or equal to 30 μm and less than or equal to 50 μm.

10. The coupled-core multicore optical fiber of claim 1, wherein each of the plurality of cores comprises an inner cladding portion and an inner core portion corresponding to the inner cladding portion, each inner cladding portion surrounding the corresponding inner core portion.

11. The coupled-core multicore optical fiber of claim 10, wherein each inner cladding portion comprises a relative refractive index $\Delta_{ICi}$, the inner core portion comprises the $\Delta_{CLi}$, and $\Delta_{CLi} > \Delta_{Ci} > \Delta_{ICi} > \Delta_{OCC}$.

12. The coupled-core multicore optical fiber of claim 10, wherein each inner cladding portion comprises a relative refractive index $\Delta_{ICi}$; the inner core portion comprises the $\Delta_{CLi}$; $\Delta_{CLi} > \Delta_{Ci} > \Delta_{ICi}$, and $\Delta_{ICi} < \Delta_{OCC}$.

13. The coupled-core multicore optical fiber of claim 12, wherein $\Delta_{OCC} < 0$.

14. The coupled-core multicore optical fiber of claim 13, wherein the inner cladding portion and the outer common cladding comprise silica-based glass containing fluorine.

15. The coupled-core multicore optical fiber of claim 1, wherein $\Delta_{Ci} < 0$.

16. The coupled-core multicore optical fiber of claim 1, wherein $\Delta_{CLi} > 0$.

17. The coupled-core multicore optical fiber of claim 1 further comprising an inner common cladding disposed in the outer common cladding, the plurality of cores disposed in the inner common cladding, the inner common cladding having a relative refractive index $\Delta_{ICC}$ relative to pure silica; the relative refractive index $\Delta_{ICC}$ less than the relative refractive index $\Delta_{OCC}$.

18. The coupled-core multicore optical fiber of claim 17, wherein the relative refractive index $\Delta_{OCC}<0$.

19. The coupled-core multicore optical fiber of claim 18, wherein the inner common cladding and the outer common cladding comprise silica-based glass containing fluorine.

\* \* \* \* \*